(12) United States Patent
Manabe et al.

(10) Patent No.: US 10,056,171 B2
(45) Date of Patent: Aug. 21, 2018

(54) SUBMARINE CABLE AND MULTILAYER TAPE FOR IMPERMEABLE LAYER OF SAME

(71) Applicant: FURUKAWA ELECTRIC CO., LTD., Tokyo (JP)

(72) Inventors: Hiroki Manabe, Tokyo (JP); Hiroyuki Sakakibara, Tokyo (JP); Masahiro Minamide, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/017,169

(22) Filed: Feb. 5, 2016

(65) Prior Publication Data

US 2016/0155537 A1    Jun. 2, 2016

(30) Foreign Application Priority Data

Sep. 24, 2013 (JP) .................................. 2013-197141

(51) Int. Cl.
*H01B 7/00* (2006.01)
*H01B 7/282* (2006.01)
(Continued)

(52) U.S. Cl.
CPC ............. *H01B 7/2825* (2013.01); *B32B 1/08* (2013.01); *B32B 3/30* (2013.01); *B32B 15/04* (2013.01);
(Continued)

(58) Field of Classification Search
CPC ... H01B 7/02; H01B 7/17; H01B 7/18; H01B 7/22–7/28; H01B 11/02; H01B 11/04
(Continued)

(56) References Cited

U.S. PATENT DOCUMENTS 463,107 A  *  11/1891  Degenhardt ......... H01B 11/002
                                                         174/25 R
3,244,799 A  *  4/1966  Roberts .................... H01B 7/18
                                                         174/107
(Continued)

FOREIGN PATENT DOCUMENTS

EP       0429269 A1    5/1991
EP       2750144 A1    7/2014
(Continued)

OTHER PUBLICATIONS

International Search Report issued in PCT/JP2014/074805 dated Dec. 11, 2014.
(Continued)

*Primary Examiner* — William H Mayo, III
(74) *Attorney, Agent, or Firm* — Marshall, Gerstein & Borun LLP

(57) ABSTRACT

Protrusion portions and recess portions are formed on a metal layer. The protrusion portions are repeatedly formed in a lattice shape at a pitch of P. Similarly, the recess portions are repeatedly formed in the lattice shape at the pitch of P. The protrusion portions and the recess portions are arranged in the same arrangement direction and arranged shifted to each other by half the pitch in the arrangement direction. The protrusion portions and the recess portions are formed independently of each other without contacting each other. In order to allow a multilayer tape to reliably follow the bending deformations of a power cable (submarine cable) in all directions, in an arbitrary cross-section taken in the longitudinal direction of the multilayer tape (in the axial direction of an impermeable layer), the protrusion portions or the recess portions are necessarily arranged at predetermined intervals.

17 Claims, 14 Drawing Sheets

(51) Int. Cl.

| | | |
|---|---|---|
| *H01B 7/04* | (2006.01) | |
| *B32B 15/04* | (2006.01) | |
| *B32B 1/08* | (2006.01) | |
| *B32B 3/30* | (2006.01) | |
| *B32B 15/08* | (2006.01) | |
| *H01B 7/14* | (2006.01) | |
| *H01B 7/28* | (2006.01) | |
| *B32B 15/082* | (2006.01) | |
| *B32B 15/085* | (2006.01) | |
| *B32B 15/088* | (2006.01) | |
| *B32B 15/18* | (2006.01) | |
| *B32B 15/20* | (2006.01) | |
| *B32B 27/30* | (2006.01) | |
| *B32B 27/32* | (2006.01) | |
| *B32B 27/34* | (2006.01) | |
| *B32B 5/02* | (2006.01) | |
| *B32B 7/12* | (2006.01) | |
| *B32B 25/08* | (2006.01) | |
| *B32B 25/18* | (2006.01) | |
| *B32B 25/20* | (2006.01) | |
| *B32B 27/08* | (2006.01) | |
| *B32B 27/12* | (2006.01) | |
| *B32B 3/18* | (2006.01) | |

(52) U.S. Cl.
CPC ............. *B32B 15/08* (2013.01); *H01B 7/045* (2013.01); *H01B 7/14* (2013.01); *H01B 7/282* (2013.01); *H01B 7/2806* (2013.01); *B32B 3/18* (2013.01); *B32B 5/02* (2013.01); *B32B 7/12* (2013.01); *B32B 15/082* (2013.01); *B32B 15/085* (2013.01); *B32B 15/088* (2013.01); *B32B 15/18* (2013.01); *B32B 15/20* (2013.01); *B32B 25/08* (2013.01); *B32B 25/18* (2013.01); *B32B 25/20* (2013.01); *B32B 27/08* (2013.01); *B32B 27/12* (2013.01); *B32B 27/302* (2013.01); *B32B 27/308* (2013.01); *B32B 27/32* (2013.01); *B32B 27/34* (2013.01); *B32B 2260/021* (2013.01); *B32B 2260/046* (2013.01); *B32B 2307/206* (2013.01); *B32B 2307/54* (2013.01); *B32B 2307/544* (2013.01); *B32B 2307/546* (2013.01); *B32B 2307/714* (2013.01); *B32B 2307/7242* (2013.01); *B32B 2307/7265* (2013.01); *B32B 2307/732* (2013.01); *B32B 2457/00* (2013.01); *B32B 2597/00* (2013.01); *B32B 2605/16* (2013.01); *Y02A 30/14* (2018.01)

(58) Field of Classification Search
USPC ........... 174/102 R, 102 SC, 103, 106 R, 108, 174/109, 110 R, 113 R, 115, 116 R
See application file for complete search history.

(56) References Cited

U.S. PATENT DOCUMENTS

| | | | | |
|---|---|---|---|---|
| 3,505,144 A * | 4/1970 | Kilduff | ................... | H01B 5/02 |
| | | | | 156/259 |
| 3,594,489 A * | 7/1971 | Katz | ..................... | H01B 13/06 |
| | | | | 174/110 PM |
| 3,594,492 A * | 7/1971 | Bahder | ................... | H01B 7/26 |
| | | | | 174/108 |
| 3,651,244 A * | 3/1972 | Silver | ................... | H01B 9/022 |
| | | | | 156/54 |
| 3,701,840 A * | 10/1972 | Willmore | ................ | H01B 7/02 |
| | | | | 174/102 D |
| 4,746,767 A * | 5/1988 | Gruhn | ............... | H01B 11/1016 |
| | | | | 174/105 R |
| RE42,266 E * | 4/2011 | Sparrowhawk | .... | H01B 11/1008 |
| | | | | 174/102 R |
| 8,119,907 B1 * | 2/2012 | McNutt | ............. | H01B 11/1008 |
| | | | | 174/36 |
| 9,129,727 B2 * | 9/2015 | Caveney | ........... | H01B 11/1008 |
| 9,196,398 B2 * | 11/2015 | Kroushl | ................ | H01B 11/04 |
| 2006/0048961 A1 * | 3/2006 | Pfeiler | .............. | H01B 11/1008 |
| | | | | 174/36 |
| 2009/0223694 A1 * | 9/2009 | Nordin | .............. | H01B 11/1008 |
| | | | | 174/34 |
| 2010/0101853 A1 * | 4/2010 | McNutt | .................. | H01B 13/26 |
| | | | | 174/350 |
| 2010/0186988 A1 * | 7/2010 | Jeroense | ................ | H01B 7/045 |
| | | | | 174/103 |
| 2010/0276181 A1 * | 11/2010 | Caveney | ........... | H01B 11/1008 |
| | | | | 174/25 G |
| 2012/0024565 A1 * | 2/2012 | Orini | ....................... | H01B 7/14 |
| | | | | 174/106 R |
| 2014/0166335 A1 * | 6/2014 | Kagoura | ................ | H01B 7/045 |
| | | | | 174/107 |

FOREIGN PATENT DOCUMENTS

| | | | |
|---|---|---|---|
| JP | S47-44173 A | 12/1972 | |
| JP | 58-131518 A * | 5/1983 | ............ H01B 7/28 |
| JP | S59-152629 U | 10/1984 | |
| JP | 2004-192831 A | 7/2004 | |
| JP | 2013-045552 A * | 7/2004 | ............ H01B 7/12 |
| JP | 2013-45552 A | 3/2013 | |
| WO | WO-2013/027748 A1 | 2/2013 | |

OTHER PUBLICATIONS

Written Opinion issued in PCT/JP2014/074805 dated Dec. 11, 2014.
Japanese Utility Model Application No. 29367/1982 (laid open No. 131518/1983).
Extended European Search Report issued in European Application No. 14848362.1 dated May 10, 2017.
Office Action issued in Japanese Patent Application No. 2013-197141 dated Oct. 31, 2017.

* cited by examiner

SUBMARINE CABLE AND MULTILAYER TAPE FOR IMPERMEABLE LAYER OF SAME

TECHNICAL FIELD

This present patent relates to submarine cables and the like for ocean floating installations.

BACKGROUND OF THE DISCLOSURE

In recent years, developments for renewable energy have been in progress as a global warming countermeasure. For example, practical use of floating type off-shore wind power generators that transmit electricity from wind power generators, which are ocean floating installations, has been in progress.

To transmit electricity from ocean floating installations, submarine cables are used. A submarine cable includes three power cables that are assembled and twisted together for three-phase alternating current power transmission and armoring wires provided on the periphery of the core to support the cable load, of which the exterior is further extrusion coated with a plastic layer for protection from external damages.

Known submarine cables include a torque-balanced submarine cable including a linear assembly body, which is a plurality of a cable wire and a torsion reinforcing wire twisted together in one direction, and an armoring body provided on the periphery of the linear assembly body, in which armoring wires are twisted in the direction opposite to the direction in which the cable wires and the torsion reinforcing wires are twisted so that the torsional torque applied to the linear assembly body and the armoring body is cancelled.

SUMMARY OF THE DISCLOSURE

Since such submarines cables are laid under the sea, high impermeability is required for the internal power cables. Therefore, an impermeable layer is formed on the periphery of the insulator (shielding layer) in the power cables.

On the other hand, such submarine cables are suspended from ocean floating installations that repeatedly oscillate on the sea. Therefore, deformation of the submarine cables always repeatedly occurs due to fluid force and oscillation of the floating body caused by waves and tides. Therefore, deformation is also repeatedly given to the power cables.

However, it is difficult for the power cables to follow this repeated deformation if the impermeability thereof is formed by a metal layer such as a metal tape. Consequently, it is likely that the metal layer forming the impermeable layer may be damaged, and it is said that fatigue life of the conventional impermeable layer structure is approximately five to seven years, depending on the conditions of the ocean climate.

The presently disclosed embodiments were achieved in view of such problems. Its object is to provide a submarine cable and the like with excellent bending fatigue characteristics of an impermeable layer, which is able to have both sufficient flexibility and high impermeability.

To achieve the above object, a submarine cable comprising at least a power cable, armoring portions, and an external corrosion-protective layer formed on the peripheral side of the armoring portions. The power cable includes a conductor on which an insulating layer, a shielding layer, a first impermeable layer, and a corrosion-protective layer are formed in sequence. The armoring portions are formed by disposing a plurality of wire material on the periphery side of the whole of a plurality of the power cables in the circumferential direction of the periphery of the whole power cables and providing the wire materials helically in the axial direction of the power cables. A multilayer tape in which a metal layer is interposed by resin forms the first impermeable layer. The metal layer of the multilayer tape has at least either protrusion portions or recess portions that are repeatedly formed. Each of the protrusion portions or the recess portions is formed separately from one another having a flat portion in between. At least a part of the protrusion portions or the recess portions is arranged at a predetermined pitch in an arbitrary cross section taken in the axial direction of the first impermeable layer.

As described above, since the impermeable layer is formed by a multilayer tape in which a metal layer is interposed by resin, water entering from outside can be shielded with certainty. Therefore, deterioration of the insulating performance of the cable caused by water can be prevented over a long period of time. Also, since the metal layer is interposed by resin, the metal layer may not break nor bend at the time of constructing the impermeable layer. Therefore, the impermeable layer can be reliably constructed. Furthermore, the internal shielding layer may not be damaged by the metal layer.

Also, since recess and protrusion shapes are formed on the cross sections of the metal layer, the multilayer tape (the metal layer) can be deformed easily in the forming direction of the recess and protrusion shapes when the multilayer tape is wound around. Therefore, it is possible to inhibit the multilayer tape from being an obstacle to deformation due to the flexibility of the submarine cable (power cables) when the multilayer tape is wound around.

Also presently described, flat portions are formed between the recess and protrusion shapes on the metal layer. That is, a protrusion portion and a recess portion, a protrusion portion and a protrusion portion, or a recess portion and a recess portion are never connected. In this way, it is easy to form the recess and protrusion shapes on a metal layer. For example, if a wave shape is to be formed so that the protrusion portions and the recess portions are connected continuously, it is difficult to form the joint sections of a protrusion portion and a recess portion, a protrusion portion and a protrusion portion, or a recess portion and a recess portion all smoothly and precisely. Therefore, the shapes of these joint sections are unstable and the variation of shapes becomes wider. Thus, rapid shape-varied section and the like may form a crack source or a stress concentrated section.

However, if the recess portions or the protrusion portions are formed independently and separately from each other on a flat portion, each shape tends to become stable, and the variation of shapes of the joint sections of the flat portion and the protrusion portions or the recess portions is not likely to occur. It also facilitates manufacturing of a metal mold and the like for forming such shapes.

Also, the flat portions can be used as the standard position for production control at the time of forming the recess and protrusion shapes, allowing the recess and protrusion shapes to be formed with stability by knowing the distances from the flat portions to each top part of the protrusion portions and the recess portions.

Here, if the flat portions are formed between the recess portions and the protrusion portions, the flat portions may continue in a straight line, particularly in the axial direction of the power cables. That is, a part that has no recess or protrusion shapes in the axial direction of the power cables may exist on the impermeable layer. If this happens, the impermeable layer may become an obstacle to the deformation corresponding to the flexibility of the submarine cable (power cables) as mentioned above. However, in the presently described embodiments, at least a part of the protrusion portions or the recess portions are always arranged at a predetermined pitch in an arbitrary cross section taken in the axial direction of the first impermeable layer. That is, the flat portions are never formed in straight lines in the axial direction. Therefore, recess and protrusion shapes are always repeated in the axial direction in any bending directions so that the followability for the deformation is excellent.

The metal layer may include approximately circular first protrusion portions or recess portions and approximately circular second protrusion portions or recess portions that are arranged in a lattice shape of a pitch P1 in the circumferential direction of the impermeable layer and a pitch P2 in the axial direction of the impermeable layer respectively, zigzag to each other. Each of the protrusion portions or the recess portions of the first protrusion portions or recess portions and the second protrusion portions or recess portions are arranged in the axial direction of the impermeable layer. If the diameter of the first protrusion portion or recess portion is D1 and the diameter of the second protrusion portion or recess portion is D2, the relations D1<P1 and D1<P2, D2<P1, D2<P2 and P1<D1+D2 and D1+D2<(P1$^2$+P2$^2$)$^{1/2}$ may be satisfied.

In this way, at least a part of the protrusion portions or the recess portions can always be arranged at a predetermined pitch in an arbitrary cross section taken in the axial direction of the first impermeable layer. On this occasion, if the arrangement direction is formed in the axial direction of the impermeable layer so that the distance between the protrusion portions or the recess portions is minimum, then it is possible for the metal layer to efficiently follow the bending deformation of the submarine cable (the power cables).

The metal layer may include approximately circular first protrusion portions or recess portions and approximately circular second protrusion portions or recess portions that are arranged in a lattice shape of the same pitch P respectively, zigzag to each other. If the diameter of the first protrusion portion or recess portion is D1 and the diameter of the second protrusion portion or recess portion is D2, the relation D1<P and D2<P and P<D1+D2<2$^{1/2}$×P may be satisfied, and the relation P<2$^{1/2}$×D1 or P<2$^{1/2}$×D2 may be further satisfied.

If cross sections of the metal layer have such recess and protrusion shapes, the impermeable layer can reliably follow the deformations not only in bending directions, but also in every direction. For example, electrical current flowing in the submarine cable changes according to the changes in the electrical power generated by the ocean floating wind mill and this varies the amount of heat generated in the conductor. Also, if the load increases due to strong wind in an unusual weather, greater heat is generated in the conductor of the cable. Therefore, these thermal changes cause the submarine cable not only to bend but also to expand and contract in the diameter direction. Also, some torsional stress other than bending stress may be added to the submarine cable, which oscillates and repeats unstable motions under the sea because of ocean currents and tides.

While on the other hand, in described embodiments, the recess portions or the protrusion portions can be arranged so that the flat portions are not continuous in straight lines and the recess and protrusion shapes are always continuous in every direction. Therefore, it is possible for the deformation of the metal layer to follow the deformation not only in the axial direction of the submarine cable (the power cables) but also in the circumferential direction and torsional direction.

Here, "the protrusion portions or the recess portions are formed in the position of a lattice shape" means that the protrusion portions or the recess portions are in an arrangement in which the protrusion portions or the recess portions are repeatedly formed continuously at the same pitch in two directions that are perpendicular to each other. Also, "arranged zigzag to each other" means that the first protrusion portions or recess portions and the second protrusion portions or recess portions are arranged repeatedly in the same direction respectively and are arranged shifted to each other by half the pitch in the respective repetition directions.

The metal layer may include approximately circular first protrusion portions or recess portions and approximately circular second protrusion portions or recess portions that are arranged zigzag to each other at the same pitch P respectively in a rhombus-shaped form of which a diagonal line is arranged toward the axial direction of the impermeable layer. If the diameter of the first protrusion portion or recess portion is D1, the diameter of the second protrusion portion or recess portion is D2, the pitch of the first protrusion portion or recess portion in the diagonal direction of the rhombus, which is the pitch for the circumferential direction of the impermeable layer, is P1, and the pitch of the first protrusion portion or recess portion in the diagonal direction of the rhombus, which is the pitch for the longitudinal direction of the impermeable layer, is P2, the relation D1<P and D2<P and (D1+D2)<P1 and (D1+D2)<P2 may be satisfied. Furthermore, the relation P1<2D1 or P1<2D2 may also be satisfied.

As mentioned above, the first protrusion portions or recess portions and the second protrusion portions or recess portions can be arranged respectively not only in the lattice form arrangement so to intersect with each other, but also can be arranged in the rhombus-shaped form. In this case, it is still possible for the metal layer to efficiently follow the bending deformation of the submarine cable (the power cables).

The metal layer may include approximately elliptical first protrusion portions or recess portions and approximately elliptical second protrusion portions or recess portions that are arranged in a lattice shape of a pitch P1 in the circumferential direction of the impermeable layer and a pitch P2 in the axial direction of the impermeable layer respectively, zigzag to each other. The direction of the major axis or the minor axis of each of the protrusion portions or the recess portions of the first protrusion portions or recess portions and the second protrusion portions or recess portions are arranged in the axial direction of the impermeable layer, and each of the protrusion portions or the recess portions of the first protrusion portions or recess portions and the second protrusion portions or recess portions are arranged in the axial direction of the impermeable layer. If the diameter of the first protrusion portion or recess portion in the circumferential direction of the impermeable layer is D1W, the diameter of the first protrusion portion or recess portion in the axial direction of the impermeable layer is D1L, the diameter of the second protrusion portion or recess portion in the circumferential direction of the impermeable layer is D2W, the diameter of the second protrusion portion or recess portion in the axial direction of the impermeable layer is D2L, the pitch of the first protrusion portion or recess portion in the oblique direction calculated by (P1$^2$+P2$^2$)$^{1/2}$ is P3, the length of the second protrusion portion or recess portion on a line segment which connects the first protrusion portions or recess portions in the oblique direction is D2S, and the length of the first protrusion portion or recess portion on a line segment which connects the second protrusion portions or recess portions in the oblique direction is D1S, then the relation D1W<P1 and D1L<P2 and D2W<P1 and D2L<P2 and P1<D1W+D2W and D1S+D2S<P3 may be satisfied.

As described above, it is still possible for the metal layer to efficiently follow the bending deformation of the submarine cable (the power cables) even with the approximately elliptical first protrusion portions or recess portions and the approximately elliptical second protrusion portions or recess portions.

The metal layer may include approximately elliptical first protrusion portions or recess portions and approximately elliptical second protrusion portions or recess portions that are arranged in a lattice shape of the same pitch P, zigzag to each other. The direction of the major axis or the minor axis of each of the protrusion portions or the recess portions of the first protrusion portions or recess portions and the second protrusion portions or recess portions are arranged in the axial direction of the impermeable layer, and the diagonal line of the lattice form is arranged in the axial direction of the impermeable layer. If the diameter of the first protrusion portion or recess portion in the circumferential direction of the impermeable layer is D1W, the diameter of the first protrusion portion or recess portion in the axial direction of the impermeable layer is D1L, the diameter of the second protrusion portion or recess portion in the circumferential direction of the impermeable layer is D2W, the diameter of the second protrusion portion or recess portion in the axial direction of the impermeable layer is D2L, the pitch of the first protrusion portion or recess portion in the oblique direction calculated by $2^{1/2}P$ is P3, the length of the second protrusion portion or recess portion on a line segment which connects the first protrusion portions or recess portions in the forming direction thereof is D2S, and the length of the first protrusion portion or recess portion on a line segment which connects the second protrusion portions or recess portions in the forming direction thereof is D1S, then the relation D1S<P and D2S<P and D1W+D2W<P3 and D1L+D2L<P3 may be satisfied. Furthermore, the relation $P<2^{1/2}\times D1W$ or $P<2^{1/2}\times D2W$ and $P<2^{1/2}\times D1L$ or $P<2^{1/2}\times D2L$ may be satisfied.

As mentioned above, the approximately elliptical first protrusion portions or recess portions and the approximately elliptical second protrusion portions or recess portions can be arranged respectively not only in the lattice form arrangement so to intersect with each other, but also can be arranged in the rhombus-shaped form. In this case, it is also possible for the metal layer to efficiently follow the bending deformation of the submarine cable (the power cables).

The metal layer may include approximately elliptical first protrusion portions or recess portions and approximately elliptical second protrusion portions or recess portions that are arranged in a rhombus-shaped form of the same pitch P, zigzag to each other. The direction of the major axis or the minor axis of each of the protrusion portions or the recess portions of the first protrusion portions or recess portions and the second protrusion portions or recess portions are arranged in the axial direction of the impermeable layer and the diagonal line of the rhombus is arranged in the axial direction of the impermeable layer. If the diameter of the first protrusion portion or recess portion in the circumferential direction of the impermeable layer is D1W, the diameter of the first protrusion portion or recess portion in the axial direction of the impermeable layer is D1L, the diameter of the second protrusion portion or recess portion in the circumferential direction of the impermeable layer is D2W, the diameter of the second protrusion portion or recess portion in the axial direction of the impermeable layer is D2L, the pitch of the first protrusion portion or recess portion in the oblique direction, which is the pitch to the circumferential direction of the impermeable layer, is P1, the pitch of the first protrusion portion or recess portion in the oblique direction, which is the pitch to the longitudinal direction of the impermeable layer, is P2, the length of the second protrusion portion or recess portion on a line segment which connects the first protrusion portions or recess portions in the forming direction thereof is D2S, and the length of the first protrusion portion or recess portion on a line segment which connects the second protrusion portions or recess portions in the forming direction thereof is D1S, then the relation D1S<P and D2S<P and (D1W+D2W)<P1 and (D1L+D2L)<P2 may be satisfied, and, furthermore, P1<2D1W or P1<2D2W may also be satisfied.

As mentioned above, even if the approximately elliptical first protrusion portions or recess portions and the approximately elliptical second protrusion portions or recess portions are arranged respectively in the rhombus-shaped form, it is still possible for the metal layer to reliably follow not only the bending deformation but also the deformation in any directions.

A second impermeable layer may be further formed on the inner surface of the external corrosion-protective layer and the second impermeable layer may be formed by the multilayer tape.

Also, an impermeable layer may be formed to the external corrosion-protective layer, and if this impermeable layer is formed by the multilayer tape in the same way as the impermeable layer formed for the power cables as described above, then an impermeable layer that is excellent in flexibility and also in fatigue resistance can be obtained.

Another embodiment includes a multilayer tape for an impermeable layer of a submarine cable including a metal layer and resin covering portions that interpose the metal layer. The metal layer includes at least either of protrusion portions or recess portions that are repeatedly formed separately from one another thereon with flat portions in between, and at least a part of the protrusion portions or the recess portions is arranged at a predetermined pitch in an arbitrary cross section taken in the longitudinal direction of the multilayer tape.

As described above, when the impermeable layer of the submarine cable is formed by using the multilayer tape for the impermeable layer, water entering from outside can be shielded with certainty. Therefore, it is possible to prevent deterioration of the insulating performance of the cable by water over a long period of time. Also, it is possible to inhibit the multilayer tape from being an obstacle to the deformation due to the flexibility of the submarine cable when the multilayer tape is wound around.

The metal layer may include approximately circular first protrusion portions or recess portions and approximately circular second protrusion portions or recess portions that are arranged respectively in a lattice shape of a pitch P1, which is the pitch in the width direction of the multilayer tape, and a pitch P2, which is the pitch in the longitudinal direction of the multilayer tape, zigzag to each other. Each of the protrusion portions or the recess portions of the first protrusion portions or recess portions and the second protrusion portions or recess portions are arranged in the longitudinal direction of the multilayer tape. If the diameter of the first protrusion portion or recess portion is D1 and the diameter of the second protrusion portion or recess portion is D2, the relations D1<P1 and D1<P2, D2<P1, D2<P2 and P1<D1+D2 and D1+D2<$(P1^2+P2^2)^{1/2}$ may be satisfied.

If such a multilayer tape is lapped longitudinally, an arrangement direction in which the distance between the protrusion portions or the recess portions is minimum can be formed in the axial direction of the impermeable layer and it is possible for the metal layer to efficiently follow the bending deformation of the submarine cable (the power cables).

The metal layer may include first protrusion portions or recess portions and second protrusion portions or recess portions that are arranged respectively in a lattice shape of the same pitch P, zigzag to each other. If the diameter of the first protrusion portion or recess portion is D1 and the diameter of the second protrusion portion or recess portion is D2, the relation D1<P and D2<P and P<D1+D2<$2^{1/2} \times P$ may be satisfied, and furthermore, the relation P<$2^{1/2} \times D1$ or P<$2^{1/2} \times D2$ may be satisfied.

If such a multilayer tape is lapped longitudinally, the flat portions are never continuous in straight lines in any directions and the protrusion portions or the recess portions are arranged so that the recess and protrusion shapes are always continuous. Therefore, it is possible for the metal layer to follow the deformation not only in the axial direction of the submarine cable (the power cables) but also in the circumferential direction and torsional direction thereof.

Furthermore, forming the recess and protrusion shapes periodically on any positions in the width direction of the multilayer tape can decrease the tension at the time of winding the multilayer tape. Therefore, manufacturing of the cable becomes easy. For example, if only the flexibility of the cable after winding is highly valued and a multilayer tape with recess and protrusion shapes formed periodically only in the axial direction is used, the cable is not easily bent in its width direction. Therefore, a large tension is required at the time of winding the multilayer tape. However, by forming recess and protrusion shapes periodically at an arbitrary position in both axial and width directions, not only the flexibility after winding of the cable can be improved, but also the winding of the cable can be facilitated.

The metal layer may include approximately circular first protrusion portions or recess portions and approximately circular second protrusion portions or recess portions that are arranged respectively in a rhombus-shaped form of the same pitch P, zigzag to each other. If the diameter of the first protrusion portion or recess portion is D1, the diameter of the second protrusion portion or recess portion is D2, the pitch of the first protrusion portion or recess portion in the diagonal direction of the rhombus, which is the pitch for the width direction of the multilayer tape, is P1, and the pitch of the first protrusion portion or recess portion in the diagonal direction of the rhombus, which is the pitch for the longitudinal direction of the multilayer tape, is P2, the relation D1<P and D2<P and (D1+D2)<P1 and (D1+D2)<P2 may be satisfied, and, further more, the relation P1<2D1 or P1<2D2 may also be satisfied.

If such a multilayer tape is lapped longitudinally, the approximately circular first protrusion portions or recess portions and the approximately circular second protrusion portions or recess portions can be arranged in the rhombus-shaped form respectively.

The metal layer may include approximately elliptical first protrusion portions or recess portions and approximately elliptical second protrusion portions or recess portions that are arranged in a lattice shape of a pitch P1 in the width direction of the multilayer tape and a pitch P2 in the longitudinal direction of the multilayer tape respectively, zigzag to each other. The direction of the major axis or the minor axis of each of the protrusion portions or the recess portions of the first protrusion portions or recess portions and the second protrusion portions or recess portions are arranged in the longitudinal direction of the multilayer tape and each of the protrusion portions or the recess portions of the first protrusion portions or recess portions and the second protrusion portions or recess portions are arranged in the longitudinal direction of the multilayer tape. If the diameter of the first protrusion portion or recess portion in the width direction of the multilayer tape is D1W, the diameter of the first protrusion portion or recess portion in the longitudinal direction of the multilayer tape is D1L, the diameter of the second protrusion portion or recess portion in the width direction of the multilayer tape is D2W, the diameter of the second protrusion portion or recess portion in the longitudinal direction of the multilayer tape is D2L, the pitch of the first protrusion portion or recess portion in the oblique direction calculated by $(P1^2+P2^2)^{1/2}$ is P3, the length of the second protrusion portion or recess portion on a line segment which connects the first protrusion portions or recess portions in the oblique direction is D2S, and the length of the first protrusion portion or recess portion on a line segment which connects the second protrusion portions or recess portions in the oblique direction is D1S, then the relation D1W<P1 and D1L<P2 and D2W<P1 and D2L<P2 and P1<D1W+D2W and D1S+D2S<P3 may be satisfied.

If such a multilayer tape is lapped longitudinally, the approximately elliptical first protrusion portions or recess portions and the approximately elliptical second protrusion portions or recess portions can be arranged in the lattice shape.

The metal layer may include approximately elliptical first protrusion portions or recess portions and approximately elliptical second protrusion portions or recess portions that are arranged in a lattice shape of the same pitch P, zigzag to each other. The direction of the major axis or the minor axis of each of the protrusion portions or the recess portions of the first protrusion portions or recess portions and the second protrusion portions or recess portions are arranged in the longitudinal direction of the multilayer tape and the diagonal lines of the lattice form are arranged in the longitudinal direction of the multilayer tape. If the diameter of the first protrusion portion or recess portion in the width direction of the multilayer tape is D1W, the diameter of the first protrusion portion or recess portion in the longitudinal direction of the multilayer tape is D1L, the diameter of the second protrusion portion or recess portion in the width direction of the multilayer tape is D2W, the diameter of the second protrusion portion or recess portion in the longitudinal direction of the multilayer tape is D2L, the pitch of the first protrusion portion or recess portion in the oblique direction calculated by $2^{1/2}P$ is P3, the length of the second protrusion portion or recess portion on a line segment which connects the first protrusion portions or recess portions in the oblique direction is D2S, and the length of the first protrusion portion or recess portion on a line segment which connects the second protrusion portions or recess portions in the oblique direction is D1S, then the relation D1W<P and D1L<P and D2W<P and D2L<P and D1W+D2W<P3 and D1L+D2L<P3 may be satisfied. Furthermore, P<$2^{1/2} \times D1W$ or P<$2^{1/2} \times D2W$ and P<$2^{1/2} \times D1L$ or P<$2^{1/2} \times D2L$ may also be satisfied.

If such a multilayer tape is lapped longitudinally, the approximately elliptical first protrusion portions or recess portions and the approximately elliptical second protrusion portions or recess portions can be arranged in the lattice shape and the direction of the diagonal line of the lattice form can be arranged in the axial direction of the submarine cable.

The metal layer may include approximately elliptical first protrusion portions or recess portions and approximately elliptical second protrusion portions or recess portions that are arranged in a rhombus-shaped form of the same pitch P, zigzag to each other. The direction of the major axis or the minor axis of each of the protrusion portions or the recess portions of the first protrusion portions or recess portions and the second protrusion portions or recess portions are arranged in the longitudinal direction of the multilayer tape and the diagonal lines of the rhombus are arranged in the longitudinal direction of the multilayer tape. If the diameter of the first protrusion portion or recess portion in the width direction of the multilayer tape is D1W, the diameter of the first protrusion portion or recess portion in the longitudinal direction of the multilayer tape is D1L, the diameter of the second protrusion portion or recess portion in the width direction of the multilayer tape is D2W, the diameter of the second protrusion portion or recess portion in the longitudinal direction of the multilayer tape is D2L, the pitch of the first protrusion portion or recess portion in the oblique direction, which is the pitch for the width direction of the multilayer tape, is P1, the pitch of the first protrusion portion or recess portion in the oblique direction, which is the pitch for the longitudinal direction of the multilayer tape, is P2, the length of the second protrusion portion or recess portion on a line segment which connects the first protrusion portions or recess portions in the forming direction thereof is D2S, and the length of the first protrusion portion or recess portion on a line segment which connects the second protrusion portions or recess portions in the forming direction thereof is D1S, then the relation D1S<P and D2S<P and (D1W+D2W)<P1 and (D1L+D2L)<P2 may be satisfied. Furthermore, the relation P1<2D1W or P1<2D2W may also be satisfied.

If such a multilayer tape is lapped longitudinally, the approximately elliptical first protrusion portions or recess portions and the approximately elliptical second protrusion portions or recess portions can be arranged in the rhombus-shaped form and the direction of the diagonal lines of the rhombus can be arranged in the axial direction of the submarine cable.

The presently described embodiments can provide a submarine cable and the like with excellent bending fatigue characteristics of an impermeable layer, which is able to have both sufficient flexibility and high impermeability.

BRIEF DESCRIPTION OF DRAWINGS

FIG. 3 (b) is a cross section of A-A line in FIG. 3 (a).
FIG. 3 (c) is a cross section of B-B line in FIG. 3 (a).
FIG. 4 (b) is a perspective view of the resin covering layer and a partially enlarged view showing the multilayer tape 30.
FIG. 5 (b) is a perspective view of the resin covering layer and a cross sectional view of each part in FIG. 5 (a).

FIG. 6 (a) is a perspective view of the resin covering layer and a plan view showing a multilayer tape 30a.
FIG. 6 (b) is a perspective view of the resin covering layer and a partially enlarged view showing the multilayer tape 30a.
FIG. 7 (b) is a perspective view of the resin covering layer and a partially enlarged view showing the multilayer tape 30b.
FIG. 8 (b) is a perspective view of the resin covering layer and a partially enlarged view showing the multilayer tape 30c.
FIG. 9 (b) shows the state after the multilayer tape 30 is wound around by longitudinal lapping.
FIG. 10 (b) illustrates the deformed state of the multilayer tape 30.
FIG. 11 (b) illustrates the impermeable effect of the multilayer tape 30.
FIG. 13 (b) shows the arrangement of recess and protrusion shapes of a sample B (prior art) of the multilayer tape sample 41.

DETAILED DESCRIPTION

Figure 1:
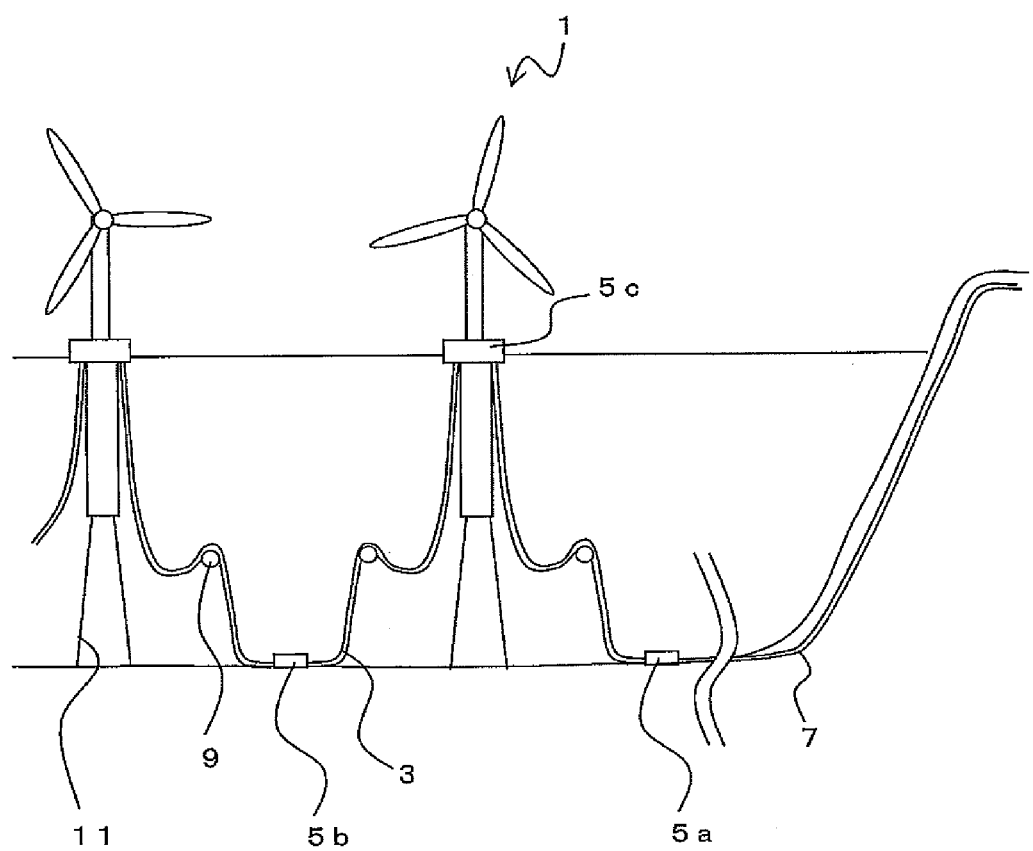
FIG. 1 shows the laying state of a submarine cable 3.

Hereinafter, a submarine cable and the like according to the present embodiments will be described. FIG. 1 shows the laying state of a submarine cable 3. An ocean floating installation 1 is disposed on the sea. The ocean floating installation 1 is, for example, a floating type ocean wind power generator. The ocean floating installation 1 floats on the sea and the lower part thereof is fixed to the seabed with a mooring rope 11.

For example, a plurality of the ocean floating installation 1 are disposed on the sea. The ocean floating installation 1 is connected to the submarine cable 3 by a connecting portion 5c. Also, the submarine cables 3 are connected to each other by connecting portions 5b, which are installed on the seabed. That is, the ocean floating installations 1 are connected to each other by the submarine cables 3.

Also, a buoy 9 is connected to the submarine cable 3 between the ocean floating installation 1 and the connecting portion 5b. That is, buoy 9 lets the submarine cable 3 floating in the sea. The submarine cable 3 will be described in detail later.

The submarine cable 3 on the side of the shore is connected to an undersea cable 7 by a connecting portion 5a which is installed on the seabed. The undersea cable 7 has an approximately equivalent structure as the submarine cable 3. The undersea cable 7 is connected to the power transmission device and the like on the shore. That is, electricity generated in the ocean floating installation 1 is transmitted through the submarine cable 3 and the undersea cable 7 to the shore.

Here, the ocean floating installation 1 oscillates due to waves, tides, and the like on the sea. Therefore, the submarine cable 3 connected to the ocean floating installation 1 follows the oscillation of the ocean floating installation 1 and repeatedly receives large bending deformation in the sea. However, since the submarine cable 3 floats in the sea by the buoy 9, the submarine cable 3 does not drag along the seabed and, also, is prevented from being locally given the stress by rise and fall of the tide and ocean currents.

Figure 2:
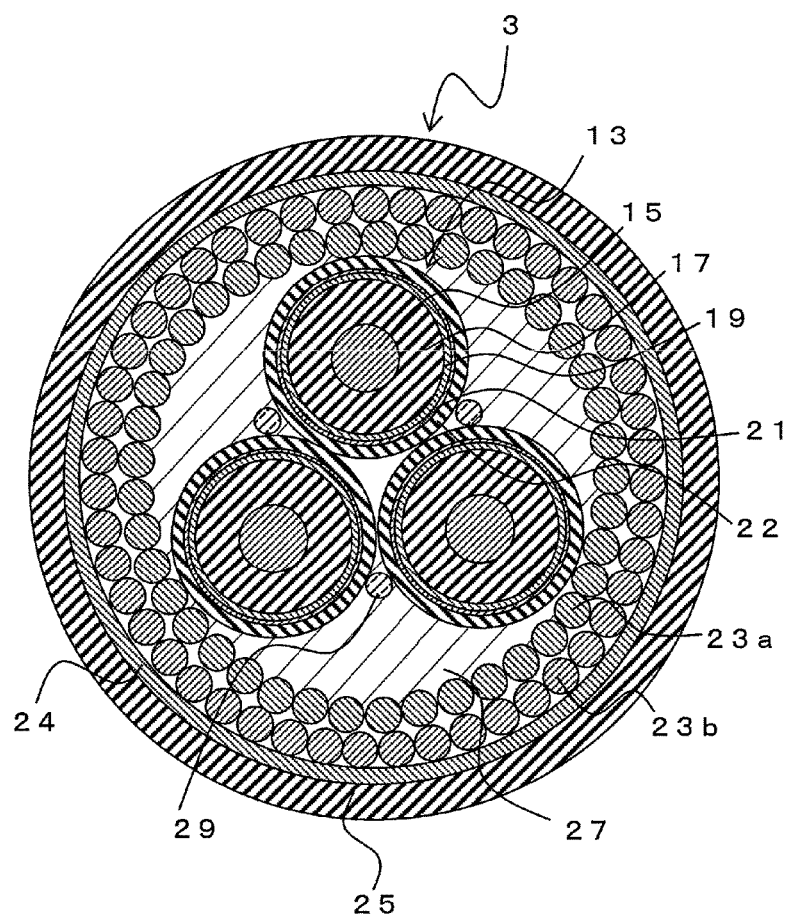
FIG. 2 is a cross section of the submarine cable 3.

Next, the structure of the submarine cable 3 will be described. FIG. 2 is a cross section of the submarine cable 3. The submarine cable 3 mainly includes power cables 13, armorings 23a, 23b, an external corrosion-protective layer 25, and the like.

The power cable 13 includes a conducting portion 15, an insulating portion 17, a shielding layer 19, an impermeable layer 21, a corrosion-protective layer 22, and the like. The conducting portion 15 is formed, for example, by twisting copper wires together.

The insulating portion 17 is provided on the external periphery of the conducting portion 15. The insulating portion 17 is made of, for example, cross-linked polyethylene. The insulating portion 17 may include three layers of an internal semiconducting layer, an insulating layer, and an external semiconducting layer. The three-layered structure with the internal semiconducting layer, the insulating layer, and the external semiconducting layer, can suppress water tree deterioration, which is a partial discharging phenomenon, and enables to obtain an effect as a mechanical buffer layer between the insulator and the metal layer.

For example, if a conductor and an insulator or a shield and an insulator are in direct contact and there are protrusions and the like on the contacting surface, an electric field is concentrated thereto, which becomes an original point for generation of water tree or partial discharge. Thus, interposing semiconducting resin in between can moderate the electric field on the contacting surface. These internal and external semiconducting layers are sometimes called 'electric field relaxing layers'.

Also, if there is no internal semiconducting layer or external semiconducting layer, there is a possibility that the metal layer and the like of the conductor or the shield may eat into the insulator directly. If the metal layer eats into the insulator, partial discharge occurs due to concentration of the electric field, resulting in an insulation breakdown. Therefore, forming semiconducting resin layers between the insulator and the metal layer can prevent such a problem.

The shielding layer 19 is provided on the periphery of the insulating portion 17. The shielding layer 19 is made of conducting materials such as metals, conducting resin, or conducting fibers. The shielding layer 19 is connected to a ground at the end part of the submarine cable 3.

The impermeable layer 21 is provided on the periphery of the shielding layer 19. The impermeable layer 21 includes a multilayer tape which is a laminate of a metal layer and resin layers. The structure of the multilayer tape will be described later.

The corrosion-protective layer 22 is provided on the periphery of the impermeable layer 21. The corrosion-protective layer 22 is made of, for example, resin which is extrusion coated on the periphery of the impermeable layer 21. The corrosion-protective layer 22 is for protecting each of the layers inside. For the corrosion-protective layer 22, polyamide resin such as polyethylene, ethylene-1-butene copolymer, ethylene-vinyl acetate copolymer, ethylene-ethyl acrylate copolymer, ethylene-propylene-diene terpolymer, nylon 6-6, nylon 12, and nylon 11, polyarylate resin, or non-cross-linked polyvinyl chloride resin may be used for example.

Three of the power cables 13 that are structured as above are assembled and twisted together for three-phase alternating current power transmission. Also, after assembling and twisting the three power cables 13 together, an intermediate layer 27 such as resin string is formed in the gap to form an approximately circular core. An armoring portion that supports the load of the submarine cable 3 is provided on the periphery of the core obtained. Also, communication cables such as optical cables 29 may be provided in the intermediate layer 27 if necessary. Here, in order to decrease the effects of the bending deformation caused by the deformation of the submarine cable as much as possible, it is preferable to provide the optical cables at three positions that are in contact with the two corrosion-protective layers 22 of the neighboring cable conductors in the intermediate layer 27. Such arrangement can stabilize the positions of the communication cables and, at the same time, decrease the stress applied to the communication cables since the communication cables can be located at the positions close to the center.

The armoring portion includes, for example, two layers of the armorings 23a and 23b. The armorings 23a and 23b are made of wire materials such as metal wires (copper wire or stainless wire) or fiber reinforced plastic wires. The armoring portion has a plurality of the armorings 23a and 23b arranged side by side in the circumferential direction respectively and wound around the periphery of the core at a long pitch without any gaps. That is, the armorings 23a and 23b are formed so that the winding pitch is long enough to the outer diameter of the armorings 23a and 23b. The armoring 23a on the inner circumference side and the armoring 23b on the outer circumference side are wound spirally around the periphery of the core in the directions opposite to each other.

An impermeable layer 24 is provided on the periphery of the armoring portion (the armorings 23a and 23b) if necessary. Also, an external corrosion-protective layer 25 is provided on the periphery of the impermeable layer 24. The external corrosion-protective layer 25 may be provided directly on the periphery of the armoring portion without providing the impermeable layer 24. The external corrosion-protective layer 25 is made of, for example, resin that is extrusion coated on the periphery of the exterior portion. Polyolefin resin or polyamide resin (polyamide 11, polyamide 12, and the like) can be used as the resin to form the external corrosion-protective layer 25 for example.

(First Embodiment)

Figure 3:
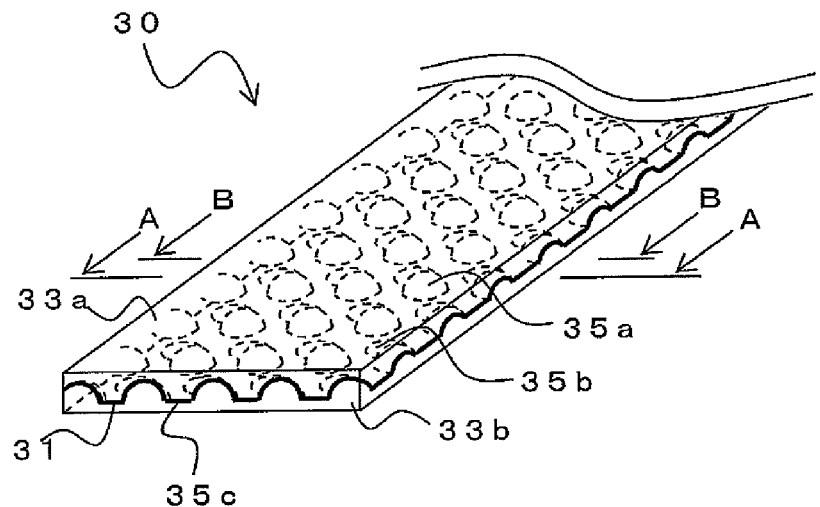
FIG. 3 (a) is a perspective view showing the structure of a multilayer tape 30.
Figure 3:
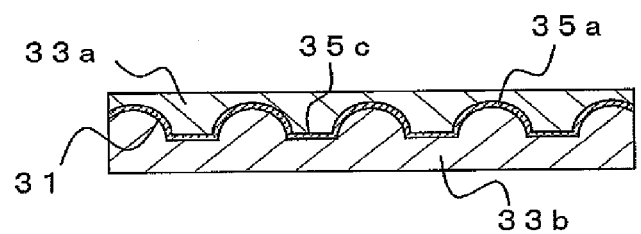
Figure 3:
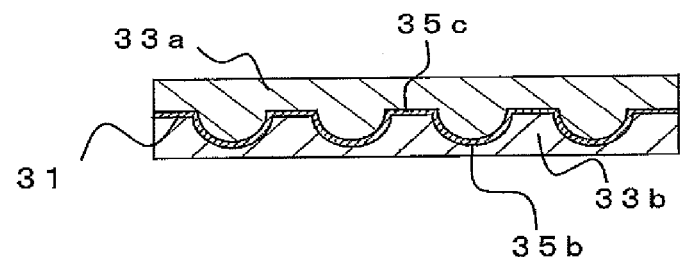

Next, a multilayer tape 30 that forms the impermeable layer 21 will be described. FIGS. 3(a) to 3(c) show the multilayer tape 30; FIG. 3 (a) is a perspective view, FIG. 3 (b) is a cross-sectional view of A-A line in FIG. 3 (a), and FIG. 3 (c) is a cross-sectional view of B-B line in FIG. 3 (a). The multilayer tape 30 includes a metal layer 31 and resin covering portions 33a and 33b. The metal layer 31 is interposed between the resin covering portions 33a and 33b.

The metal layer 31 may be a thin film, which is easy to be processed, with excellent corrosion-resistance. For example, stainless steel, aluminum, copper, lead, clad steel of which the surface is cladded with a corrosion-resistant material or the like can be used. Here, if weight reduction is important, it is preferable to use stainless steel, aluminum, clad steel, or the like. The thickness of the metal layer 31 is, for example, approximately 0.05 mm and the thickness of the entire multilayer tape 30 may be, for example, 0.2 to 1.0 mm.

The resin covering portions 33a and 33b are resin members and can prevent the metal layer 31 from bending, tearing, and wrinkling at the time of constructing the impermeable layer 21. The material used for the resin covering portions 33a and 33b will be described later.

Approximately circular recess and protrusion shapes are formed on the metal layer 31. For example, as shown in FIG. 3(b), protrusion portions 35a are formed at predetermined intervals on a cross section of the metal layer 31. Also, as shown in FIG. 3 (c), recess portions 35b are formed at predetermined intervals on another cross section of the metal layer 31. The protrusion portions 35a and the recess portions 35b are arranged independently of each other without contacting each other, and flat portions 35c are formed between the protrusion portions 35a and the recess portions 35b.

The metal layer 31 as above can be formed, for example, by letting a metal film pass through a roll with recess and protrusion shapes formed on the surface thereof. It is also possible to form the recess and protrusion shapes by press molding of the metal film at predetermined intervals. The recess and protrusion shapes may also be formed by several steps of sequential press (transfer press).

The multilayer tape 30 can be manufactured by extrusion coating the resin onto the metal film processed with the recess and protrusion shapes for example. Or, a metal film with the recess and protrusion shapes may be placed in a corresponding metal mold and the resin may be injected for integration. Or, individually formed resin members and the metal film having the corresponding recess and protrusion shapes may be integrated with publically known techniques such as bonding or crimping. Also, the metal layer can be formed by vapor deposition on the resin member that has the recess and protrusion shapes formed in advance on the surface thereof.

The height of the recess and protrusion shapes is preferably between 0.2 mm and 0.6 mm and particularly preferable between 0.3 mm and 0.5 mm. If the height of the recess and protrusion shapes is too small, the effect of forming the recess and protrusion shapes is small. If the height of the recess and protrusion shapes is too large, the thickness change becomes large, impairing the durability on the contrary, and deformation of the recess and protrusion shapes may occur at the time of manufacturing.

Also, the pitch of the protrusion portion 35a or the recess portion 35b of the recess and protrusion shapes is preferably between 0.4 and 4 mm. If the recess and protrusion pitch is too small, processing workability is impaired since deformation is concentrated locally at the time of processing the recess and protrusion shapes. If the recess and protrusion pitch is too large, the processing of recess and protrusion shapes becomes easy, however, effect of improving the durability becomes less since the effect of absorbing the deformation by the protrusion portions 35a and the recess portions 35b becomes less.

Figure 4:
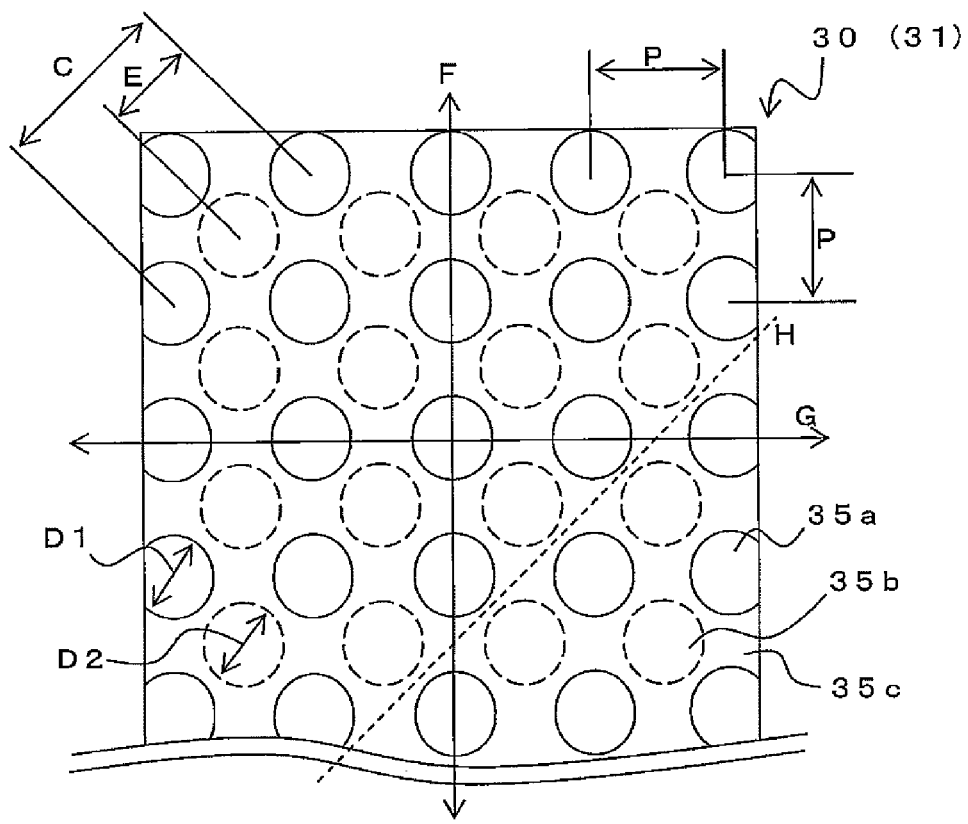
FIG. 4 (a) is a perspective view of a resin covering layer and a plan view showing the multilayer tape 30.
Figure 4:
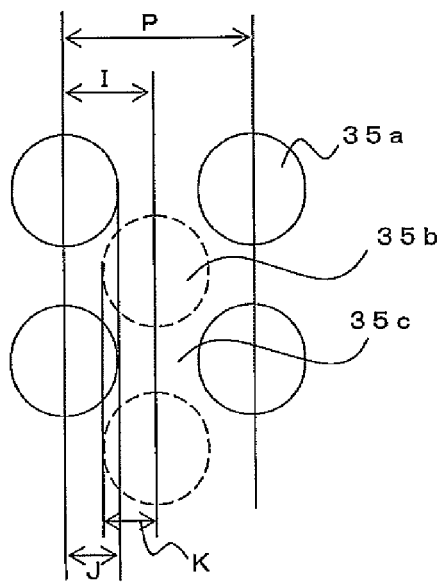

FIG. 4 (a) is a perspective view of the resin covering portion showing the multilayer tape 30. In the drawings below, the protrusion portions 35a are shown with solid lines and the recess portions are shown with dotted lines. As described above, protrusion portions 35a and recess portions 35b are formed on the metal layer 31. The protrusion portions 35a are formed repeatedly in a lattice shape at the pitch P. The arrangement directions of the protrusion portions 35a correspond to the longitudinal direction (direction F in the drawing) and the width direction (direction G in the drawing) of the multilayer tape 30. Here, the arrangement directions of the protrusion portions 35a are the directions in which the protrusion portions 35a that are closest to each other are lined.

Similarly, the recess portions 35b are repeatedly formed in a lattice shape at the pitch P. The arrangement directions of the recess portions 35b are the same as that of the protrusion portions 35a, and the recess portions 35b are arranged in each direction shifted by half the pitch to the protrusion portions 35a. That is, a recess portion 35b is positioned at the center of four surrounding crosswise and lengthwise protrusion portions 35a, and a protrusion portion 35a is positioned at the center of four surrounding crosswise and lengthwise recess portions 35b.

The protrusion portions 35a and the recess portions 35b are formed independently to each other without contacting with each other. That is, the protrusion portion 35a and the recess portion 35b are arranged separately with the flat portion 35c in between. Also, the protrusion portion 35a and the protrusion portion 35a or recess portion 35b and the recess portion 35b are arranged separated from each other with a flat portion in between.

Here, the diameter of the protrusion portion 35a is D1 and the diameter of the recess portion 35b is D2. The condition for the protrusion portions 35a to be formed independently with a flat portion in between without contacting with each other is $$D1 < P \tag{1}$$

Also, similarly, the condition for the recess portions 35b to be formed independently with a flat portion in between without contacting with each other is $$D2 < P \tag{2}$$

Also, since the minimum pitch between the protrusion portion 35a and the recess portion 35b (E in the drawing) is half the pitch (C in the drawing) of the protrusion portions 35a in the oblique direction (i.e. the direction in which the protrusion portion 35a and the recess portion 35b are lined), $$C = 2^{1/2} \times P,$$

and therefore $$E = 2^{1/2}/2 \times P.$$

Therefore, the condition for forming a flat portion between the protrusion portion 35a and the recess portion 35b without contacting with each other is $$(D1+D2)/2 < E$$

and therefore $$(D1+D2) < 2^{1/2} \times P \tag{3}$$

That is, it is required to satisfy the relations (1) to (3) for the protrusion portions 35a and the recess portions 35b to be arranged independently from each other.

Here, when the multilayer tape 30 functions as the impermeable layer 21, the axial direction of the power cables 13 (the submarine cable 3) is in the longitudinal direction of the multilayer tape 30. That is, the forming direction of the protrusion portions 35a or the recess portions 35b corresponds to the axial direction of the power cables 13. In this case, if the power cables 13 (the submarine cable 3) bend and deform, the metal layer 31 deforms due to the tension force toward the longitudinal direction of the multilayer tape 30. At this time, if the recess and protrusion shapes are formed on the metal layer 31, the metal layer 31 can easily follow the deformation.

However, if the flat portions 35c between the protrusion portions 35a and the recess portions 35b are arranged in a straight line in the axial direction of the impermeable layer 21, the metal layer 31 has no recess and protrusion shapes on this part. Therefore, followability to the deformation is impaired. That is, in order to reliably follow the bending deformation of the power cables 13 (the submarine cable 3) in all directions, it is necessary for the protrusion portions 35a or the recess portions 35b to be always arranged at predetermined intervals in an arbitrary cross section taken in the longitudinal direction of the multilayer tape 30 (the axial direction of the impermeable layer 21).

FIG. 4 (b) is a partially enlarged view of FIG. 4 (a). In order to always arrange the protrusion portions 35a or the recess portions 35b in the longitudinal direction of the multilayer tape 30, if the pitch of the protrusion portions 35a and the recess portions 35b in each of the arrangement directions thereof (the width direction of the multilayer tape 30) is I (I=P/2), then it is required:

$$I < J + K.$$

Since $J = D1/2$, $K = D2/2$,
$I < (D1+D2)/2$, and therefore $$P < (D1+D2) \quad (4)$$

is to be satisfied. That is, from (3) and (4), $$P < (D1+D2) < 2^{1/2} \times P \quad (5)$$

is to be satisfied.

Figure 5:
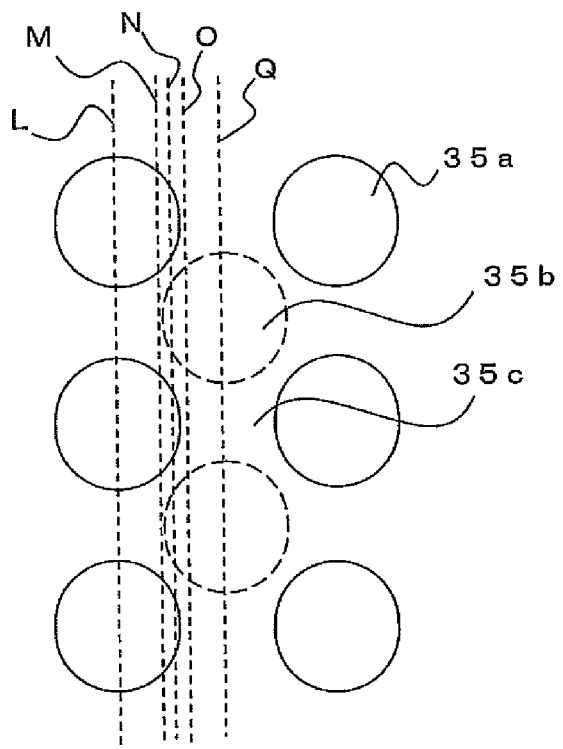
FIG. 5 (a) is a perspective view of the resin covering layer and a plan-enlarged view showing the multilayer tape 30.
Figure 5:
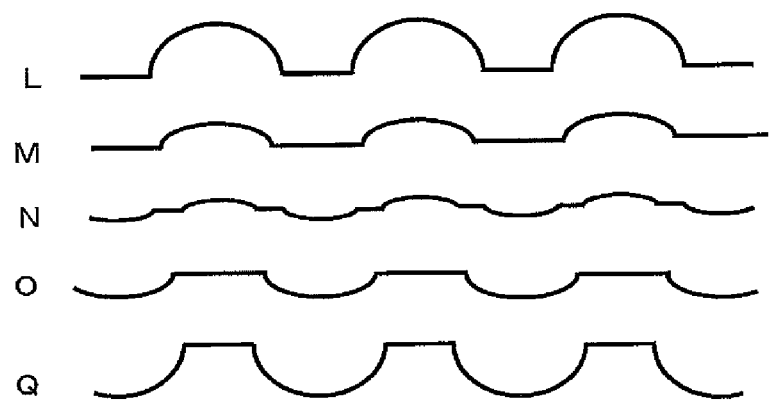

FIG. 5 (a) is similar to FIG. 4 (a) and FIG. 5 (b) shows the cross-sectional views (the recess and protrusion shapes of the metal layer 31) of FIG. 5 (a) at each part. The line L in FIG. 5 (a) is a cross section that passes through the centers of the protrusion portions 35a. As shown in FIG. 5 (b), the protrusion portions 35a are arranged at a predetermined pitch on this cross section. Also, the line M in FIG. 5 (a) is in the proximity of the end parts of the protrusion portions 35a and is a tangent to the recess portions 35b. As shown in FIG. 5 (b), the protrusion portions 35a are arranged at a predetermined pitch also on this cross section.

The line N in FIG. 5 (a) is a cross section that passes through the midway between the protrusion portions 35a and the recess portions 35b. As shown in FIG. 5 (b), the protrusion portions 35a and the recess portions 35b are arranged at a predetermined pitch on this cross section. Also, the line O in FIG. 5 (a) is in the proximity of the end parts of the recess portions 35b and is a tangent to the protrusion portions 35a. As shown in FIG. 5 (b), the recess portions 35b are arranged at a predetermined pitch on this cross section. The line Q in FIG. 5 (a) passes through the centers of the recess portions 35b. As shown in FIG. 5 (b), the recess portions 35b are arranged at a predetermined pitch also on this cross section.

As described above, any of the cross sections in the longitudinal direction of the multilayer tape 30 never has the flat portions 35c arranged in a straight line without the protrusion portions 35a or the recess portions 35b formed at all. That is, an arbitrary cross section always has the protrusion portions 35a or the recess portions 35b formed at a predetermined pitch. Therefore, in whichever direction the power cables 13 (the submarine cable 3) is bent, it is possible for the metal layer 31 to follow the bending deformation since the recess and protrusion shapes are formed on every cross section of the metal layer 31.

Forming the arrangement directions in the axial direction of the impermeable layer 21 so that the distance between the protrusion portions 35a or the recess portions 35b is closest as above makes it possible for the metal layer 31 to efficiently follow the bending deformation of the power cables 13 (the submarine cable 3).

Figure 6:
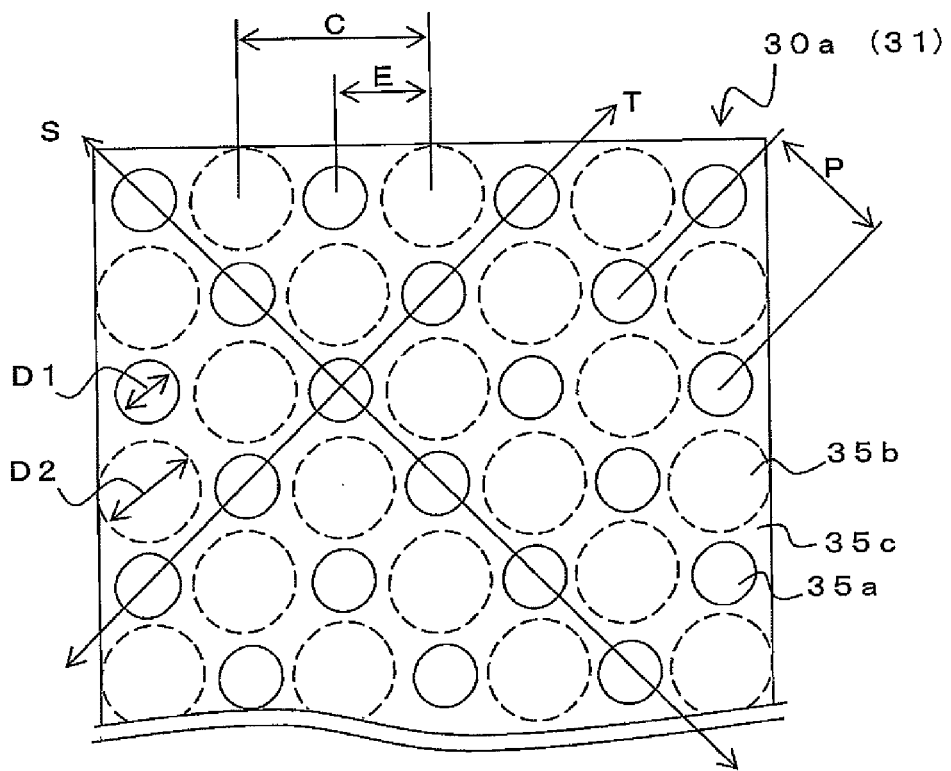
Figure 6:
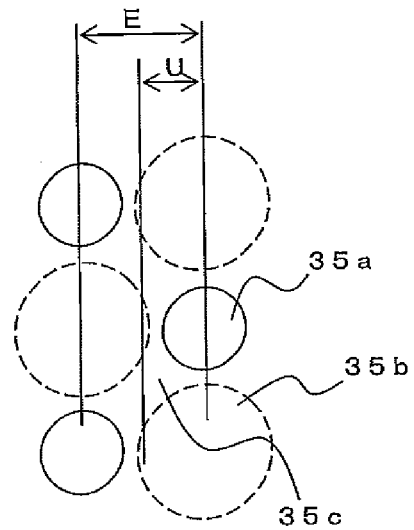

In embodiments, a multilayer tape 30a shown in FIG. 6(a) may also be used. FIG. 6 (a) is a plan view of the multilayer tape 30a (a perspective view of the resin covering portion) and FIG. 6 (b) is a partially enlarged view thereof. The multilayer tape 30a has an approximately similar structure as the multilayer tape 30, except for the arrangement of the recess and protrusion shapes of the metal layer 31. Redundant explanations will be omitted in the descriptions below.

The protrusion portions 35a and the recess portions 35b are repeatedly formed in a lattice shape at a pith P. The arrangement directions of the protrusion portions 35a and the recess portions 35b correspond to the directions 45 degrees to the longitudinal direction of the multilayer tape 30a (direction S and direction T in the drawing).

Here, although the multilayer tape 30 described above never has the flat portions 35c formed alone in a straight line on any cross section in the longitudinal direction thereof, there is a case in which the flat portions 35c are arranged in a straight line in the direction 45 degrees to the longitudinal direction (line H in FIG. 4 (a) for example). If the power cables 13 (the submarine cable 3) deforms only by simple bending, it is necessary to follow the deformation due to tension force and the like in the axial direction. However, as mentioned above, deformation in the diameter direction or torsional force may be given to the power cables 13 (the submarine cable 3). Therefore, if the multilayer tape 30 is used, there may be a case in which the followability to the deformation in the direction 45 degrees to the axial direction is impaired.

On the other hand, in the multilayer tape 30a, since the forming directions of the protrusion portions 35a or the recess portions 35b are arranged in the angle of 45 degrees to the longitudinal direction thereof, the protrusion portions 35a and the recess portions 35b are formed at predetermined intervals (pitch P) on every cross section. That is, the multilayer tape 30a always has the protrusion portions 35a or the recess portions 35b formed at a predetermined pitch on any cross section taken not only in the longitudinal direction, but also in all directions.

In order to be arranged as above, it is necessary to satisfy the relations (1) to (5) described above as well as the relations below.

The minimum pitch between the protrusion portion 35a and the recess portion 35b (E in the drawing) is half the pitch (C in the drawing) of the two protrusion portions 35a in the oblique direction (i.e. the direction in which the protrusion portion 35a and the recess portion 35b are lined). Therefore, $$C = 2^{1/2} \times P$$

and $$E = 2^{1/2}/2 \times P.$$

As shown in FIG. 6 (b), the distance U between the protrusion portion 35a or the recess portion 35b and the center line of the protrusion portion 35a and the recess portion 35b in the minimum pitch direction of the protrusion portion 35a and the recess portion 35b is $$U = 2^{1/2}/4 \times P.$$

In embodiments, the flat portions 35c are never formed in straight lines if $U < D1/2$ or $U < D2/2$ is satisfied. That is, if the relation $$P < 2^{1/2} \times D1 \text{ or } P < 2^{1/2} \times D2 \quad (6)$$

is satisfied, the flat portions 35c are never formed in straight lines. However, if the relations $P<2^{1/2}\times D1$ and $P<2^{1/2}\times D2$ are both satisfied, the protrusion portions 35a and the recess portions 35b are connected. Therefore, it is limited to the case in which either one of the relations is satisfied.

Since the multilayer tape 30a has the protrusion portions 35a or the recess portions 35b formed on any of the cross sections taken in every directions thereof, the arrangement direction of the protrusion portions 35a and the recess portions 35b with regard to the longitudinal direction of the multilayer tape 30a is not limited to the example shown in the drawings, and may be arranged in any directions.

Figure 7:
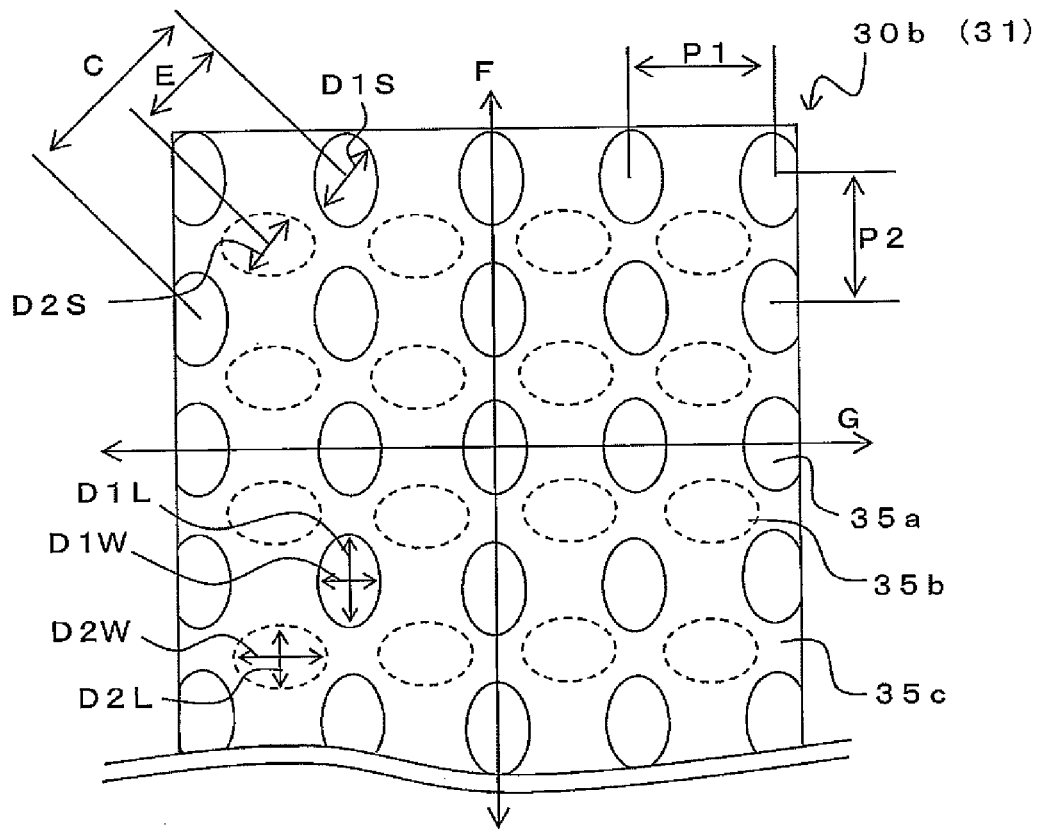
FIG. 7 (a) is a perspective view of the resin covering layer and a plan view showing a multilayer tape 30b.
Figure 7:
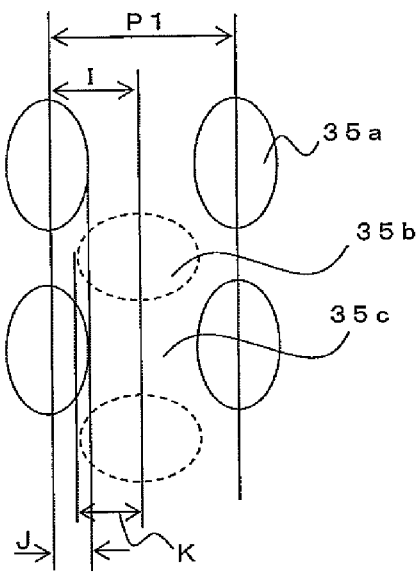

Also, a multilayer tape 30b shown in FIG. 7(a) may be used. FIG. 7(a) is a plan view of the multilayer tape 30b (a perspective view of the resin covering portion), and FIG. 7(b) is a partially enlarged view thereof. The multilayer tape 30b has an approximately similar structure as the multilayer tape 30, except for the shapes of the recess and protrusion shapes of the metal layer 31.

The protrusion portions 35a and the recess portions 35b are approximately elliptical shaped. The protrusion portions 35a and the recess portions 35b are repeatedly formed in a lattice shape with a pitch P1 in its width direction and a pitch P2 in its longitudinal direction. The arrangement directions of the protrusion portions 35a and the recess portions 35b correspond to the longitudinal direction (direction F in the drawing) and the width direction (direction G in the drawing) of the multilayer tape 30. Also, The direction of the major axis or the minor axis of the ellipses of the protrusion portions 35a and the recess portions 35b correspond to the longitudinal direction (direction F in the drawing) and the width direction (direction G in the drawing) of the multilayer tape 30.

Here, the diameter of the protrusion portion 35a in the width direction is D1W and in the longitudinal direction is D1L, and the diameter of the recess portion 35b in the width direction is D2W and in the longitudinal direction is D2L. Also, the length of the recess portion 35b on a line segment which connects the protrusion portions 35a in the oblique direction, which is the direction of the pitch calculated by $(P1^2+P2^2)^{1/2}P$ (C in the drawing), is D2S, and, similarly, the length of the protrusion portions 35a on a line segment which connects the recess portions 35b in the oblique direction is D1S. The conditions for the protrusion portions 35a to be formed without contacting with each other, for the flat portions to be formed between the protrusion portions 35a, and the protrusion portions 35a to be independently formed are $$D1W<P1 \tag{7}$$

$$D1L<P2. \tag{8}$$

Also, similarly, the conditions for the recess portions 35b to be formed without contacting with each other, for the flat portions to be formed between the recess portions 35b, and the recess portions 35b to be independently formed are $$D2W<P1 \tag{9}$$

$$D2L<P2. \tag{10}$$

Also, since the minimum pitch (E in the drawing) between the protrusion portion 35a and the recess portion 35b is half the pitch of the protrusion portions 35a (C in the drawing) in the oblique direction (i.e. the direction in which the protrusion portion 35a and the recess portion 35b are lined), $$C=(P1^2+P2^2)^{1/2}$$

therefore $$E=(P1^2+P2^2)^{1/2}/2.$$

Therefore, the condition for the protrusion portions 35a and the recess portion 35b not to be contacting with each other with flat portions formed in between is $$(D1S+D2S)/2<E,$$

therefore $$(D1S+D2S)<(P1^2+P2^2)^{1/2} \tag{11}$$

That is, it is necessary to satisfy the relations (7) to (11) for each of the protrusion portions 35a and the recess portions 35b to be arranged independently.

Also, as shown in FIG. 7(b), in order to always arrange the protrusion portions 35a or the recess portions 35b in the longitudinal direction of the multilayer tape 30b, if the pitch of each of the arrangement directions (the width direction of the multilayer tape 30) of the protrusion portions 35a and the recess portions 35b is I (I=P1/2), it is required that $$I<J+K.$$

Since $$J=D1W/2, K=D2W/2$$

and $$I<(D1W+D2W)/2,$$

$$P1<(D1W+D2W) \tag{12}$$

is to be satisfied. Similarly, in order to always arrange the protrusion portions 35a and the recess portions 35b in an arbitrary width direction of the multilayer tape 30b, $$P2<(D1L+D2L) \tag{13}$$

is to be further satisfied.

The direction of the major axis direction and the minor axis direction of the ellipses are not limited to the examples shown in the drawings. Also, the conditions for the rectangular lattice shaped arrangement of approximately circular protrusion portions or recess portions can be derived when D1L=D1W=D1S and D2L=D2W=D2S.

Also, a multilayer tape 30c shown in FIG. 8(a) may be used. FIG. 8(a) is a plan view of the multilayer tape 30c (a perspective view of the resin covering portion), and FIG. 8(b) is a partially enlarged view thereof. The multilayer tape 30c has an approximately similar structure as the multilayer tape 30a, except for the shapes and the arrangement of the recess and protrusion shapes of the metal layer 31.

The protrusion portions 35a and the recess portions 35b are approximately elliptical shaped. The protrusion portions 35a and the recess portions 35b are formed repeatedly with a pitch P in a rhombus-shaped form. As for the arrangement directions of the protrusion portions 35a and the recess portions 35b, the directions of the diagonal lines of the rhombus correspond to the longitudinal and width directions of the multilayer tape 30c. Also, the major axis direction and the minor axis direction of the ellipses of the protrusion portions 35a and the recess portions 35b correspond to the longitudinal and the width directions of the multilayer tape 30c.

Here, the diameter of the protrusion portion 35a in the width direction is D1W and in the longitudinal direction is D1L, and the diameter of the recess portion 35b in the width direction is D2W and in the longitudinal direction is D2L. Also, the length of the recess portion 35b on a line segment which connects the protrusion portions 35a in the oblique direction is D2S, and, similarly, the length of the protrusion portions 35a on a line segment which connects the recess portions 35b in the oblique direction is D1S, which are the arrangement directions of the protrusion portions 35a and the recess portions 35b (S and T in the drawing). The conditions for the protrusion portions 35a to be formed without contacting with each other, for the flat portions to be formed between the protrusion portions 35a and between the recess portions 35b, and for each of the protrusion portions 35a and the recess portions 35b to be independently formed are $$D1S<P \quad (14)$$

$$D2S<P \quad (15).$$

Also, if the minimum pitch between the protrusion portion 35a and the recess portion 35b is E1 (the pitch in the width direction, which is C1/2) or E2 (the pitch in the longitudinal direction, which is C2/2), then $$(D1W+D2W)/2<E1 \quad (16)$$

$$(D1L+D2L)/2<E2 \quad (17).$$

Here, naturally, if the pitch of the protrusion portions 35a in the width direction of the multilayer tape 30c is C1 and the pitch of the protrusion portions 35a in the longitudinal direction of the multilayer tape 30c is C2, it is necessary to satisfy D1W<C1, D1L<C2, D2W<C1, and D2L<C2.

Figure 8:
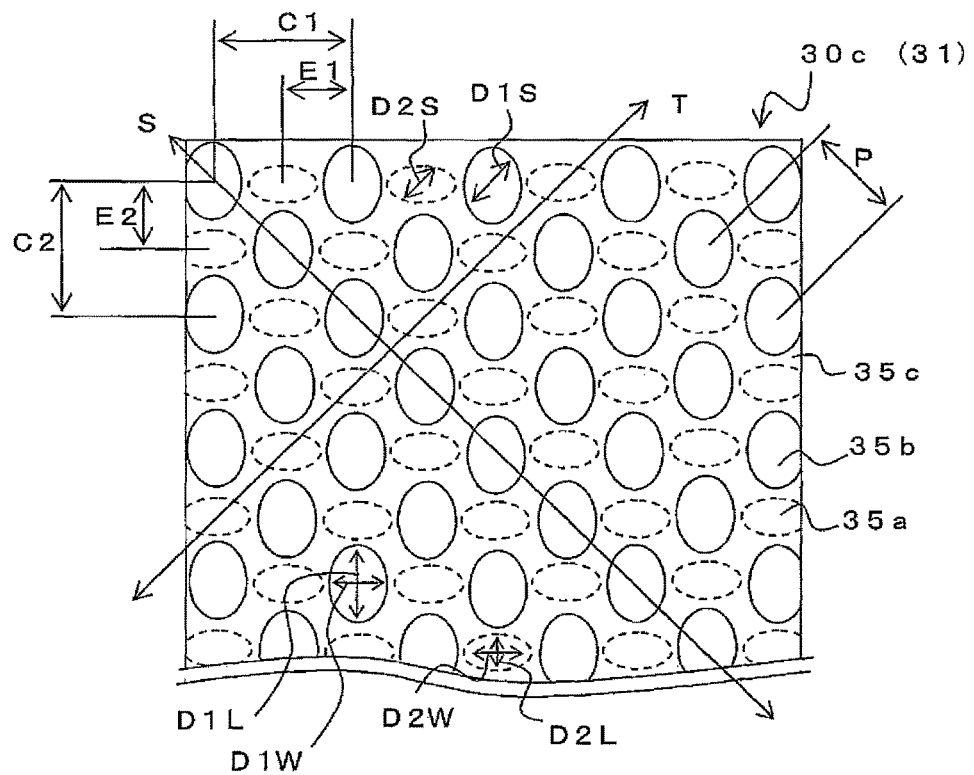
FIG. 8 (a) is a perspective view of the resin covering layer and a plan view showing a multilayer tape 30c.
Figure 8:
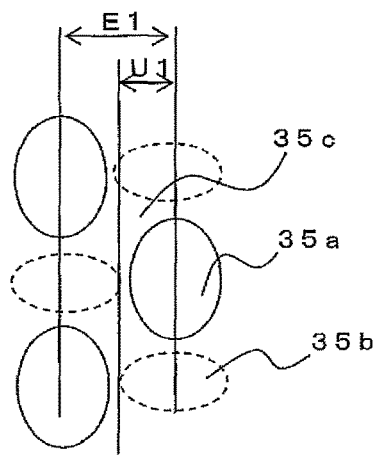

Also, as shown in FIG. 8 (b), in order to always arrange the protrusion portions 35a or the recess portions 35b in the longitudinal direction of the multilayer tape 30c, the distance U1 (U1=E1/2) from the center line of the protrusion portion 35a and the recess portion 35b is $$U1<D1W/2 \text{ or } U1<D2W/2,$$

therefore $$C1<2D1W \text{ or } C1<2D2W \quad (18)$$

is to be satisfied. Similarly, in order to always arrange the protrusion portions 35a or the recess portions 35b in an arbitrary width direction of the multilayer tape 30c, the distance U2 (U2=E2/2) from the center line of the protrusion portion 35a and the recess portion 35b is $$U2<D1L/2 \text{ or } U2<D2L/2,$$

therefore $$C2<2D1L \text{ or } C2<2D2L \quad (19)$$

is to be further satisfied.

If C1=C2 (E1=E2), the protrusion portions 35a and the recess portions 35b are arranged not in a rhombus-shaped form, but in a square lattice shape. Therefore, in this case, since U1=U2=C1/4=C2/4=$2^{1/2}$P/4, it is required that the relations (18) and (19) satisfy $$P<2^{1/2}D1W \text{ or } P<2^{1/2}D2W \quad (20)$$

$$P<2^{1/2}D1L \text{ or } P<2^{1/2}D2L \quad (21).$$

Also, the conditions for the rhombus arrangement for approximately circular protrusion portions or recess portions can be derived when D1L=D1W=D1S and D2L=D2W=D2S in the rhombus.

Next, a method for winding the multilayer tape 30 will be described. Although an example using the multilayer tape 30 will be described below, needless to say, it is also similarly applicable to the other multilayer tape 30a.

FIGS. 9(a) and 9(b) show a forming process in which the multilayer tape 30 is longitudinally wound to the power cable 13 having the shielding layer 19 formed thereon. The insulating portion 17 is formed on the periphery of the conducting portion 15 in advance and then the shielding layer 19 is formed on the periphery thereof. The multilayer tape 30 is wound around the periphery of the shielding layer 19.

Figure 9:
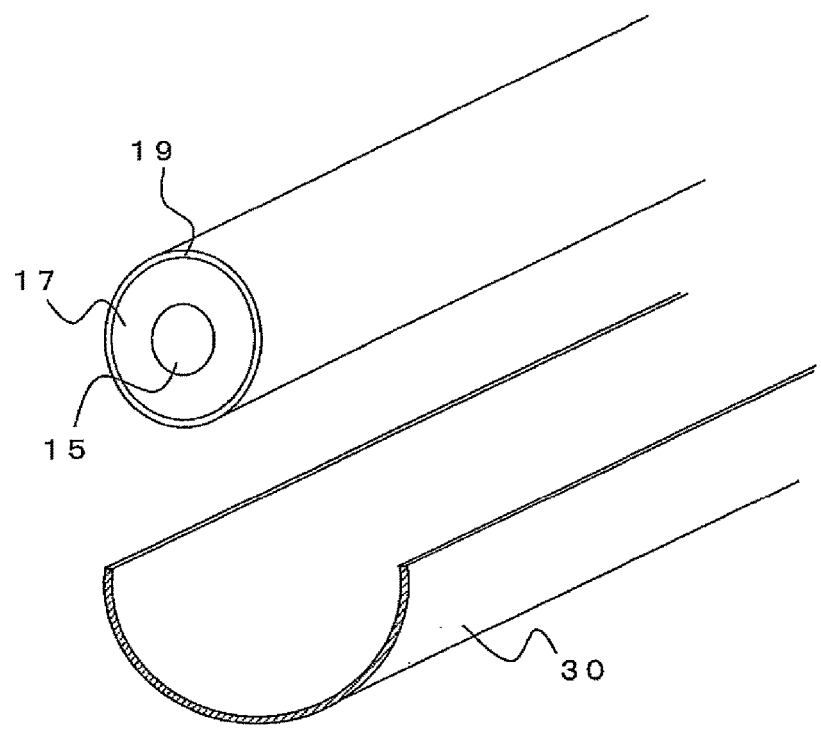
FIG. 9 (a) shows the state before the multilayer tape 30 is wound around.
Figure 9:
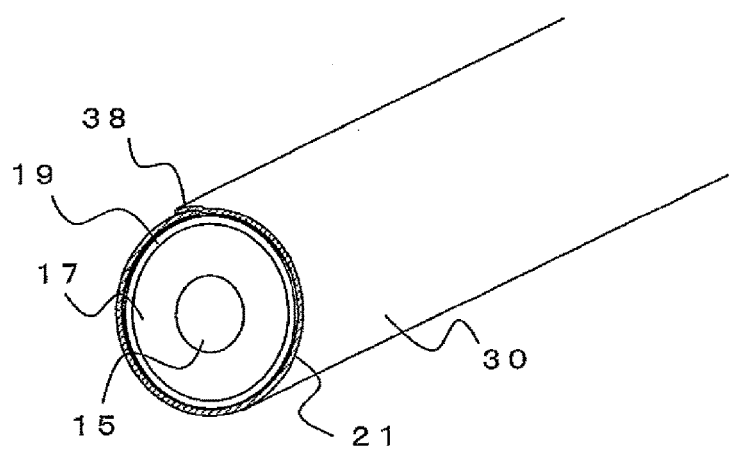

Here, it is preferable that the multilayer tape 30 is longitudinally wound as shown in FIG. 9 (a). In this case, the multilayer tape 30 is sent to the power cable 13 so that the longitudinal direction of the multilayer tape 30 is approximately in the same direction as the axial direction of the power cable 13. At this time, both sides of the multilayer tape are bent in U-shape so as to wrap the entire power cable 13 (the shielding layer 19).

Moreover, the power cable 13 (the shielding layer 19) is wrapped up by the multilayer tape 30. That is, as shown in FIG. 9 (b), the multilayer tape 30 wraps the shielding layer 19 up by lapping over both ends of the multilayer tape on the periphery of the shielding layer 19. That is, a lapped part 38 is formed along the axial direction of the power cable 13. In this way, the multilayer tape 30 is wound longitudinally around the power cable 13 (the shielding layer 19) to form the impermeable layer 21.

Thus, by winding the multilayer tape 30 so that the longitudinal direction of the multilayer tape 30 is approximately in the same direction as the axial direction of the power cable 13, the width direction of the multilayer tape 30 is in the circumferential direction of the power cable 13, and the ends of the wound portion wound in the circumferential direction are lapped over each other, the lapped length of the multilayer tape 30 with regard to the total length of the power cable 13 can be shortened compared to the case of lapping with spiral winding.

That is, although a small gap is formed between the metal layers 31 at the lapped portion 38, shortening the length of the lapped portion allows the gap between the metal layers 31 with regard to the total length of the power cable 13 to decrease. Also, since the longitudinal winding makes the lapped portion 38 to be formed straightly in the axial direction of the power cable 13, fusion of the lapped part becomes easy and manufacturability also becomes excellent.

It is necessary to have a sufficient lapping margin for the lapped portion 38. That is, making the lapping margin for the lapped portion 38 large enough enables to suppress the amount of water infiltration.

The corrosion-protective layer 22 is extrusion coated onto the periphery of the impermeable layer 21 formed as above. In this way, the power cable 13 is formed.

The melting point of the resin covering portion 33a forming the impermeable layer 21 (the resin portion that is located on the periphery side when wound and is on the side being in contact with the corrosion-protective layer 22) may be lower than the melting point of the resin forming the corrosion-protective layer 22, and the resin forming the resin covering portion 33a and the resin forming the corrosion-protective layer 22 may have compatibility. If the resin covering portion 33a and the corrosion-protective layer 22 have the compatibility and the melting point of the resin covering portion 33a is lower than the melting point of the corrosion-protective layer 22, it is easier to mutually integrate the corrosion-protective layer 22 with the multilayer tape 30 and the like when the resin for the corrosion-protective layer 22 is extruded. Therefore, when the corrosion-protective layer 22 is formed, there is no gap and the like generated between the impermeable layer 21 and the corrosion-protective layer 22.

The resin covering portion 33a can be made of nylon 12 and the corrosion-protective layer 22 can be made of nylon 11, for example, as materials having such relationships. Alternatively, the resin covering portion can be made of low-density polyethylene (LDPE) and the corrosion-protective layer 22 can be made of high-density polyethylene (HDPE), or the resin covering portion can be made of acid-modified EVA (ethylene-vinyl acetate copolymer) and the corrosion-protective layer 22 can be made of low-density polyethylene (LDPE).

Also, (the surface of) the resin covering portion 33a can be made of a rubber material (such as ethylene rubber, ethylene propylene rubber, silicon rubber, urethane rubber, butyl rubber). This increases the coefficient of friction of the corrosion-protective layer 22 with the resin covering portion 33a (the multilayer tape 30). Therefore, the corrosion-protective layer 22 adheres to the multilayer tape 30 and the like and is never displaced.

If the whole of the resin covering portion 33a is made of a rubber material, it is likely that the adhesive property with the metal layer 31 may be impaired. Therefore, the resin covering portion 33a may be multilayered. That is, the resin covering portion 33a may be provided with an inner layer of a resin layer that is excellent in the adhesive property with the metal layer 31 and have only an outer layer that is formed by a rubber material.

Also, an adhesive layer may be further formed on the periphery of the resin covering portion 33a. By forming the adhesive layer, the resin covering portion 33a can adhere to the corrosion-protective layer 22. Therefore, the corrosion-protective layer 22 adheres to the multilayer tape 30 and the like and is never displaced.

Also, the resin covering portion 33b that forms the impermeable layer 21 (the resin portion that is located on the inner circumference side when wound, which makes contact with the shielding layer 19) may be made of conductive resin. As the conductive resin, resin such as EEA (ethylene-ethyl acrylate copolymer), PVC (polyvinyl chloride), or EVA (ethylene-vinyl acetate copolymerization) mixed with conductive filler and the like can be used for example. As the conductive filler, carbon may be used for example.

This permits conduction between the inner shielding layer 19 and the resin covering portion 33b. As mentioned above, the shielding layer 19 is connected to a ground at the end part of the submarine cable 3. Meanwhile, if the metal layer 31 is floating in the cross section of the power cable 13, the metal layer 31 may be charged with electricity. However, forming the inner surface side of the resin covering portion 33b with the conductive resin permits conduction between the metal layer 31 and the shielding layer 19. Therefore, the metal layer 31 can be connected to a ground.

Figure 10:
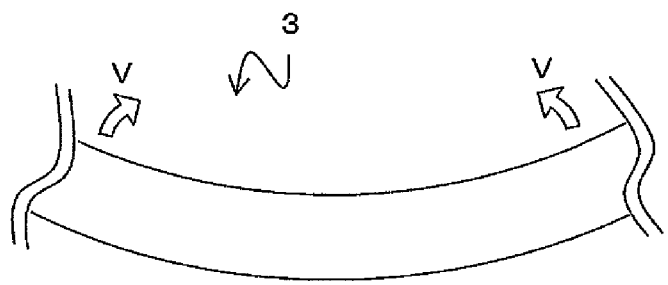
FIG. 10 (a) illustrates the bent state of the submarine cable 3.
Figure 10:
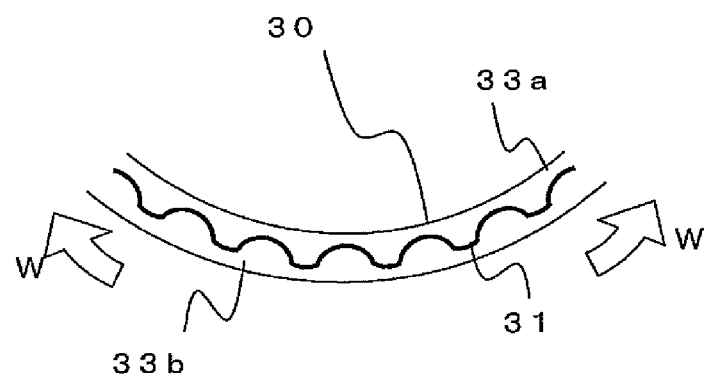

FIG. 10(a) shows the submarine cable 3 in deformation. As shown in FIG. 10 (a), when the submarine cable 3 is bent and deformed (toward the direction shown by an arrow V in the drawing), the power cables 13 inside the submarine cable 3 are also bent in the same direction. On this occasion, the power cable 13 has tensile deformation on the side of the periphery of bending.

FIG. 10 (b) is a schematic view showing the multilayer tape 30 at the tensile deformation part of the power cable 13. When the power cable 13 is bent and deformed and the tensile deformation occurs locally, the tensile deformation also occurs at the multilayer tape 30 that is wound at the said part, which tries to follow the bending of the power cable 13 (toward the direction shown by an arrow W in the drawing). At this time, the resin covering portions 33a and 33b can follow and deform easily because of the elastic deformability of the resin.

On the other hand, since the metal layer 31 has the recess and protrusion shapes, the metal layer 31 can follow the deformation easily by the extension and contraction of the protrusion portions 35a or the recess portions 35b. Particularly, since the recess and protrusion shapes are formed repeatedly in every cross section in the axial direction of the power cables 13, the multilayer tape 30 (the impermeable layer 21) can follow and deform easily to the bending deformation of the power cables 13. That is, winding of the multilayer tape 30 having the metal layer 31 does not impede the flexibility (deformation) of the power cables 13. Therefore, the power cable 13 can follow the bending deformation of the submarine cable 3.

The recess and protrusion shapes of the metal layer 31 are also formed in the circumferential direction. Therefore, the expansion and contraction in the diameter direction of the cable are also possible. For example, if the power cable 13 expands in the diameter direction and a tensile stress is generated in the circumferential direction, the multilayer tape 30 can still follow this deformation. Therefore, the power cable 13 can also follow the expansion and contraction in the diameter direction due to the temperature change and the like of the submarine cable 3. In addition, by always forming the recess and protrusion shapes on the cross sections in every direction as in the multilayer tape 30a, even if the power cable 13 oscillates due to tidal currents or ocean currents and receives a torsional deformation for example, the cable can follow any deformation in all directions including the axial direction and the circumferential direction.

Figure 11:
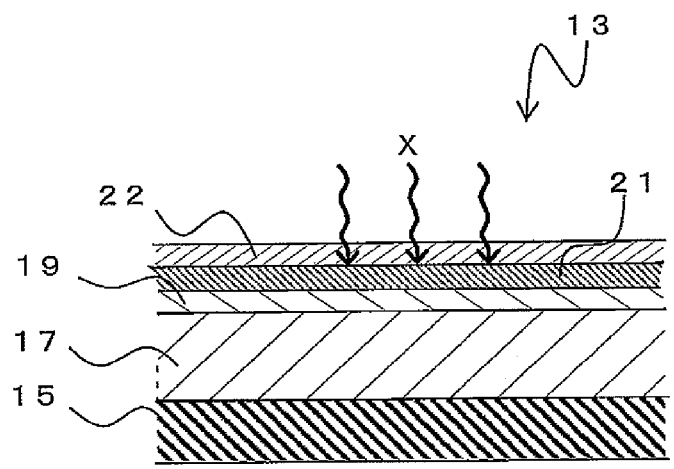
FIG. 11 (a) illustrates the effect of an impermeable layer 21.
Figure 11:
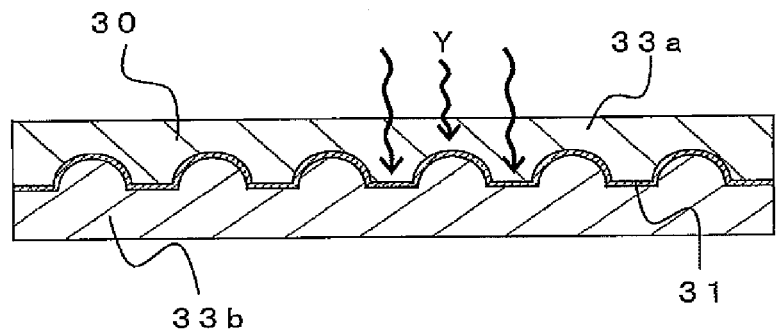

Next, functions of the impermeable layer 21 will be described. FIG. 11(a) shows the cross sections of the power cable 13. FIG. 11 (a) is a cross section in the axial direction and FIG. 11 (b) is an enlarged view of the multilayer tape 30 that forms the impermeable layer 21. As mentioned above, the submarine cable 3 is used usually being submerged beneath the sea or floating in the sea, for example.

Also, although the external corrosion-protective layer 25 and the corrosion-protective layer 22 are made of resin and have a waterproof property to some extent, the resin itself is slightly water absorbent. Therefore, sea water components can permeate slightly into the corrosion-protective layer 22. Particularly on the seabed where a high pressure is given, it is very likely for the sea water components to permeate into the corrosion-protective layer 22 during long time use (direction shown by the arrow X in the drawing).

However, the power cable 13 according to the present embodiments has the impermeable layer 21 provided on the inner circumferential surface of the corrosion-protective layer 22. Therefore, as shown in FIG. 11 (b), the metal layer 31 inside the impermeable layer 21 shields the entering of water from outside with certainty (direction shown by the arrow Y in the drawing). Therefore, it is not likely for an insulation breakdown caused by water entering into the insulating portion 17 to occur.

As described above, since the impermeable layer 21 is provided on the periphery of the shielding layer 19, an insulation breakdown caused by water entering from outside does not occur. Also, since the impermeable layer 21 is formed by the multilayer tape 30, which has the metal layer 31 interposed by the resin covering portions 33a and 33b, and the like, the water flowing from the outside in the direction of the tube diameter (the center direction of the tube) can be shielded with certainty by the metal layer 31.

Also, since the resin covering portions 33a and 33b interpose the metal layer 31, the metal layer 31 does not tear or bend at the time of constructing the impermeable layer 21 so that the impermeable layer 21 can be reliably constructed. Furthermore, since the metal layer 31 is not directly in contact with the shielding layer 19, each of the layers may not be damaged at the time of manufacturing.

Also, since the cross sections of the metal layer 31 of the multilayer tape 30 have the recess and protrusion shapes, the multilayer tape 30 (the metal layer 31) can be deformed easily in expansion/contraction in the forming directions of the recess and protrusion shapes when the multilayer tape 30 is wound. Also, since the metal layer 31 has the recess and protrusion shapes, it is possible to alleviate local concentration of stress generated on the metal layer 31 when the submarine cable 3 (the power cables 13) is bent. Therefore, it is possible to improve the fatigue characteristic for long-term repetitive bending so that a flexible tube with excellent long-term reliability can be obtained.

Also, all the protrusion portions 35a and the recess portions 35b are formed independently. That is, the protrusion portion 35a and the recess portion 35b are never connected and, also, the protrusion portion 35a and the protrusion portion 35a or the recess portion 35b and the recess portion 35b are never connected. Therefore, it is possible to stably form the shapes of the protrusion portion 35a and the recess portion 35b. For example, if the protrusion portion 35a and the protrusion portion 35a are connected, it is likely that a rapid shape-changing part may be formed at the joint point thereof. These joint points are unstable in shapes and cause unevenness of the shapes. Also, if such unevenness of the shapes occurs, this can be the source for cracks and the like in the metal layer 31. Whereas, in the present embodiments, since all the protrusion portion 35a and the recess portion 35b are formed independently, the shapes can be easily stabilized and the processing is easy.

Also, the protrusion portion 35a and the recess portion 35b are formed also in the circumferential direction of the power cables 13 when the multilayer tape 30 is wound. Therefore, the multilayer tape 30 (the metal layer 31) can easily follow not only the bending of the submarine cable 3 (the power cables 13), but also the deformation in the diameter direction so that high flexibility can be securely obtained.

If the impermeable layer 24 is formed on the inner circumference side of the external corrosion-protective layer 25, the multilayer tapes 30 or 30a may be used for the impermeable layer 24. In this case, it is preferable that the resin portion on the periphery side of the multilayer tape that forms the impermeable layer 24 has compatibility with the external corrosion-protective layer 25 and the like, and the melting point thereof is lower than the melting point of the resin that forms the external corrosion-protective layer 25.

Although the embodiments have been described referring to the attached drawings, the technical scope is not limited to the embodiments described above. It is obvious that persons skilled in the art can think out various examples of changes or modifications within the scope of the technical idea disclosed in the claims, and it will be understood that they naturally belong to the technical scope.

For example, although examples in which the protrusion portion 35a and the recess portion 35b are formed are described above, the present embodiments are not limited thereto. The protrusion portions 35a may be replaced by recess portions and the recess and protrusion shapes may be formed only with the recess portions and the flat portions 35c. Or, the recess portions 35b may be replaced by protrusion portions and the recess and protrusion shapes may be formed only with the protrusion portions and the flat portions 35c. That is, as long as first protrusion portions or recess portions and second protrusion portions or recess portions are formed at the same pitch in the lattice shape being shifted each other at half the pitch in the forming direction of the protrusion portions or recess portions, either of the protrusion or the recess shape is permissible.

Working Examples

Figure 12:
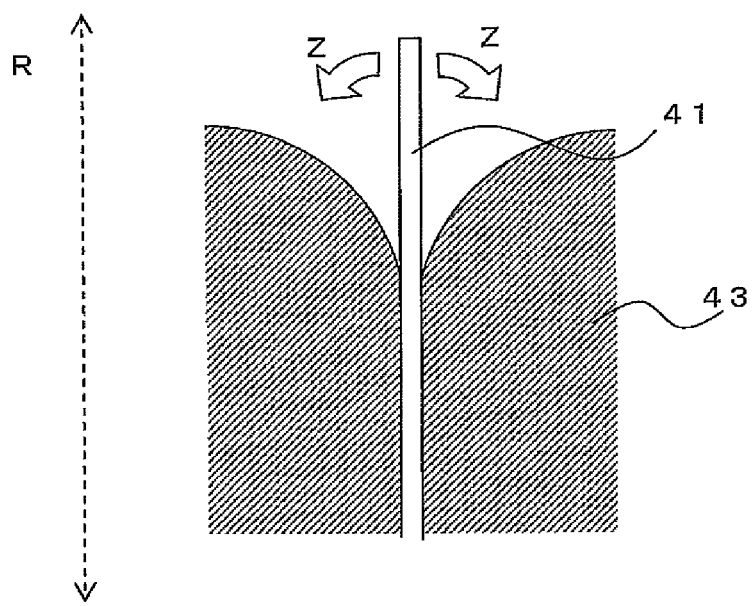
FIG. 12 illustrates a bending test method for a multilayer tape sample 41.

Next, the fatigue durability with the arrangement of the recess and protrusion shapes was evaluated. First, recess and protrusion shapes were formed on a metal layer and a multilayer tape was prepared by laminating both sides thereof with resin. As shown in FIG. 12, a multilayer tape sample 41 was inserted into a bending tool 43, and repeated bending along the bending tool 43 (toward the direction shown by arrow Z in the drawing) was given to the multilayer tape sample 41. On this occasion, terminals were provided at both ends of the metal layer of the multilayer tape and the electrical resistance of the metal layer was measured. The fracture of the metal layer was checked by increase in the value of the electrical resistance. One cycle of the motion of the multilayer tape 41 started from the middle, moved to the right, back to the middle, to the left, and back to the middle. Also, the evaluation was performed with various amount of deformation given to the multilayer tape sample 41 by changing the bending tool 43.

Figure 13:
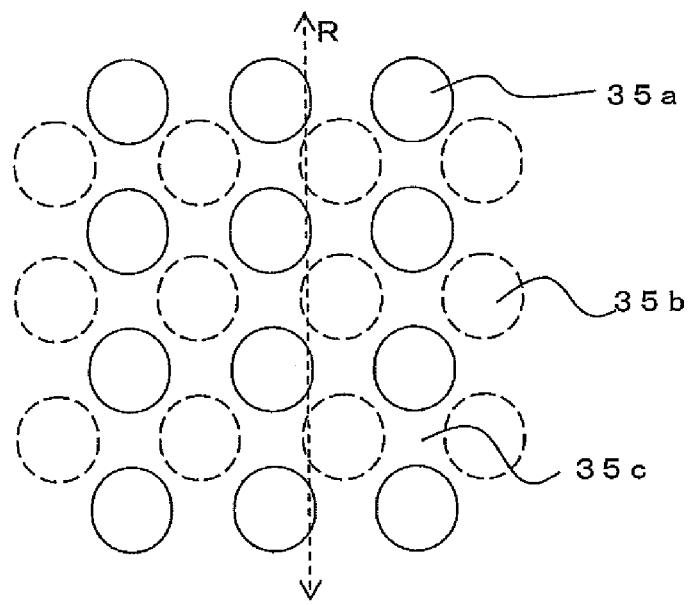
FIG. 13 (a) shows the arrangement of recess and protrusion shapes of a sample A of the multilayer tape sample 41.
Figure 13:
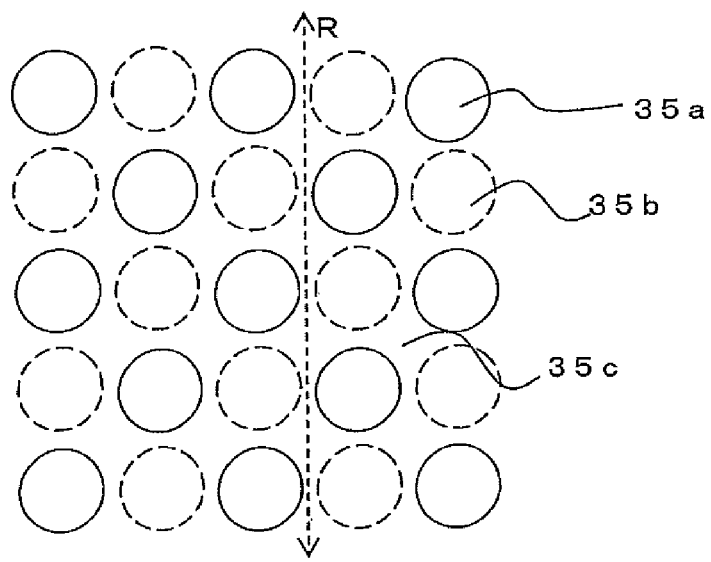

Two types of samples, one shown in FIG. 13 (a) and another shown in FIG. 13 (b), were prepared as the evaluated samples. Here, the longitudinal direction of the multilayer tape sample 41 set in the bending tool 43 was called direction R. That is, the direction in which tension and compression are added by bending test was R.

The sample shown in FIG. 13 (a) (hereinafter, sample A) was arranged such that the protrusion portions 35a or the recess portions 35b were always formed in the longitudinal direction of the multilayer tape sample 41. On the other hand, the sample shown in FIG. 13 (b) (hereinafter, sample B) had the protrusion portions 35a or the recess portions 35b of the same size and the pitch, but the forming direction thereof was changed by 45 degrees so that the flat portions 35c were arranged in straight lines in the longitudinal direction of the multilayer tape sample 41.

The amount of deformation (half amplitude deformation) generated on the metal layer by repeated bending was calculated from the radius of curvature of the bending tool and the thickness of the multilayer tape sample, and a double-logarithmic graph of the number of times of fracture to the half amplitude deformation was obtained. According to ASTM E 739, S-N curves of each of the samples were made using double-logarithmic linear regression model to compare the fatigue characteristics. For the unevenness of the number of times of fracture, twice of the standard deviation SD (Standard Deviation) was taken into consideration.

Figure 14:
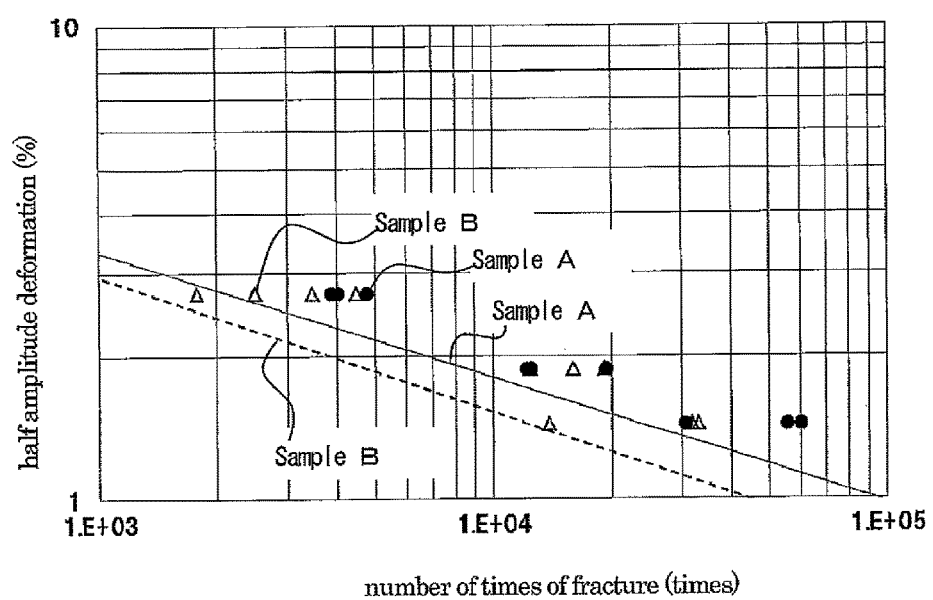
FIG. 14 shows the results of the bending test.

The results are shown in FIG. 14. Circular plotting and the solid line show the results of sample A and triangular plotting and the dotted line show the results of sample B.

Comparing both samples at the half amplitude deformation of 2% for example, it was found that sample A (the number of times of fracture was approximately 7000), in which the flat portions 35c are not continuous in the longitudinal direction, has approximately twice the life time compared to sample B (the number of times of fracture was approximately 4000). Thus, better fatigue characteristics can be obtained by arranging the recess and protrusion shapes in which the flat portions 35c do not continue and the protrusion portions 35a or the recess portions 35b are always formed on any cross sections.

What is claimed is:

1. A submarine cable comprising at least:
   a power cable including a conductor on which an insulating layer, a shielding layer, a first impermeable layer, and a corrosion-protective layer are formed in sequence;
   armoring portions formed by disposing a plurality of wire materials on the periphery side of the whole of a plurality of the power cables in the circumferential direction of the periphery of the whole power cables and providing the wire materials helically in the axial direction of the power cables; and
   an external corrosion-protective layer formed on the peripheral side of the armoring portion; wherein,
   the first impermeable layer is formed with a multilayer tape in which a metal layer is interposed by resin;
   the metal layer of the multilayer tape has at least either protrusion portions or recess portions that are repeatedly formed and each of the protrusion portions or the recess portions is formed separately from one another having a flat portion in between;
   the protrusion portions or the recess portions are approximately circular shaped or approximately elliptical shaped; and
   at least a part of the protrusion portions or the recess portions is arranged at a predetermined pitch in an arbitrary cross section of the first impermeable layer taken in the axial direction of the power cable.

2. The submarine cable according to claim 1, wherein
   the metal layer includes approximately circular first protrusion portions or recess portions and approximately circular second protrusion portions or recess portions that are arranged in a lattice shape of a pitch P1 in the circumferential direction of the impermeable layer and a pitch P2 in the axial direction of the impermeable layer respectively, zigzag to each other;
   each of the protrusion portions or the recess portions of the first protrusion portions or recess portions and the second protrusion portions or recess portions are arranged in the axial direction of the impermeable layer; and
   if the diameter of the first protrusion portion or recess portion is D1 and the diameter of the second protrusion portion or recess portion is D2, the relations D1<P1 and D1<P2, D2<P1, D2<P2 and P1<D1+D2 and D1+D2<$(P1^2+P2^2)^{1/2}$ are satisfied.

3. The submarine cable according to claim 1, wherein
   the metal layer includes approximately circular first protrusion portions or recess portions and approximately circular second protrusion portions or recess portions that are arranged in a lattice shape of the same pitch P respectively, zigzag to each other; and
   if the diameter of the first protrusion portion or recess portion is D1 and the diameter of the second protrusion portion or recess portion is D2, the relation D1<P and D2<P and P<D1+D2<$2^{1/2}$×P is satisfied, and the relation P<$2^{1/2}$×D1 or P<$2^{1/2}$×D2 is further satisfied.

4. The submarine cable according to claim 1, wherein
   the metal layer includes approximately circular first protrusion portions or recess portions and approximately circular second protrusion portions or recess portions that are arranged zigzag to each other at the same pitch P respectively in a rhombus-shaped form of which diagonal lines are arranged toward the axial direction of the impermeable layer; and
   if the diameter of the first protrusion portion or recess portion is D1, the diameter of the second protrusion portion or recess portion is D2, the pitch of the first protrusion portion or recess portion in the diagonal direction of the rhombus, which is the pitch for the circumferential direction of the impermeable layer, is P1, and the pitch of the first protrusion portion or recess portion in the diagonal direction of the rhombus, which is the pitch for the longitudinal direction of the impermeable layer, is P2, the relation D1<P and D2<P and (D1+D2)<P1 and (D1+D2)<P2 is satisfied and the relation P1<2D1 or P1<2D2 is further satisfied.

5. The submarine cable according to claim 1, wherein
   the metal layer includes approximately elliptical first protrusion portions or recess portions and approximately elliptical second protrusion portions or recess portions that are arranged in a lattice shape of a pitch P1 in the circumferential direction of the impermeable layer and a pitch P2 in the axial direction of the impermeable layer respectively, zigzag to each other;
   the direction of the major axis or the minor axis of each of the protrusion portions or the recess portions of the first protrusion portions or recess portions and the second protrusion portions or recess portions are arranged in the axial direction of the impermeable layer and each of the protrusion portions or the recess portions of the first protrusion portions or recess portions and the second protrusion portions or recess portions are arranged in the axial direction of the impermeable layer; and
   if the diameter of the first protrusion portion or recess portion in the circumferential direction of the impermeable layer is D1W, the diameter of the first protrusion portion or recess portion in the axial direction of the impermeable layer is D1L, the diameter of the second protrusion portion or recess portion in the circumferential direction of the impermeable layer is D2W, the diameter of the second protrusion portion or recess portion in the axial direction of the impermeable layer is D2L, the pitch of the first protrusion portion or recess portion in the oblique direction calculated by $(P1^2+P2^2)^{1/2}$ is P3, the length of the second protrusion portion or recess portion on a line segment which connects the first protrusion portions or recess portions in the oblique direction is D2S, and the length of the first protrusion portion or recess portion on a line segment which connects the second protrusion portions or recess portions in the oblique direction is D1S, then the relation D1W<P1 and D1L<P2 and D2W<P1 and D2L<P2 and P1<D1W+D2W and D1S+D2S<P3 is satisfied.

6. The submarine cable according to claim 1, wherein
   the metal layer includes approximately elliptical first protrusion portions or recess portions and approximately elliptical second protrusion portions or recess portions that are arranged in a lattice shape of the same pitch P, zigzag to each other;

the direction of the major axis or the minor axis of each of the protrusion portions or the recess portions of the first protrusion portions or recess portions and the second protrusion portions or recess portions are arranged in the axial direction of the impermeable layer, and the diagonal line of the lattice form is arranged in the axial direction of the impermeable layer; and if the diameter of the first protrusion portion or recess portion in the circumferential direction of the impermeable layer is D1W, the diameter of the first protrusion portion or recess portion in the axial direction of the impermeable layer is D1L, the diameter of the second protrusion portion or recess portion in the circumferential direction of the impermeable layer is D2W, the diameter of the second protrusion portion or recess portion in the axial direction of the impermeable layer is D2L, the pitch of the first protrusion portion or recess portion in the oblique direction calculated by $2^{1/2}$P is P3, the length of the second protrusion portion or recess portion on a line segment which connects the first protrusion portions or recess portions in the forming direction thereof is D2S, and the length of the first protrusion portion or recess portion on a line segment which connects the second protrusion portions or recess portions in the forming direction thereof is D1S, then the relation D1S<P and D2S<P and D1W+D2W<P3 and D1L+D2L<P3 is satisfied and the relation P<$2^{1/2}$×D1W or P<$2^{1/2}$×D2W and P<$2^{1/2}$×D1L or P<$2^{1/2}$×D2L is further satisfied.

7. The submarine cable according to claim 1, wherein
the metal layer includes approximately elliptical first protrusion portions or recess portions and approximately elliptical second protrusion portions or recess portions that are arranged in a rhombus-shaped form of the same pitch P, zigzag to each other;
the direction of the major axis or the minor axis of each of the protrusion portions or the recess portions of the first protrusion portions or recess portions and the second protrusion portions or recess portions are arranged in the axial direction of the impermeable layer and the diagonal lines of the rhombus are arranged in the axial direction of the impermeable layer; and
if the diameter of the first protrusion portion or recess portion in the circumferential direction of the impermeable layer is D1W, the diameter of the first protrusion portion or recess portion in the axial direction of the impermeable layer is D1L, the diameter of the second protrusion portion or recess portion in the circumferential direction of the impermeable layer is D2W, the diameter of the second protrusion portion or recess portion in the axial direction of the impermeable layer is D2L, the pitch of the first protrusion portion or recess portion in the oblique direction, which is the pitch for the circumferential direction of the impermeable layer, is P1, the pitch of the first protrusion portion or recess portion in the oblique direction, which is the pitch for the longitudinal direction of the impermeable layer, is P2, the length of the second protrusion portion or recess portion on a line segment which connects the first protrusion portions or recess portions in the forming direction thereof is D2S, and the length of the first protrusion portion or recess portion on a line segment which connects the second protrusion portions or recess portions in the forming direction thereof is D1S, then the relation D1S<P and D2S<P and (D1W+D2W)<P1 and (D1L+D2L)<P2 is satisfied, and, furthermore, P1<2D1W or P1<2D2W is satisfied.

8. The submarine cable according to claim 1, wherein
a second impermeable layer is further formed on the inner surface of the external corrosion-protective layer and the second impermeable layer is formed by the multilayer tape.

9. The submarine cable according to claim 1, wherein the cross sections of the protrusion portions or the recess portions are arc-shaped.

10. A multilayer tape for an impermeable layer of a submarine cable comprising:
a metal layer; and
resin covering portions that interpose the metal layer; wherein,
the metal layer includes at least either of protrusion portions or recess portions that are repeatedly formed separately from one another thereon with flat portions in between;
the protrusion portions or the recess portions are approximately circular shaped or approximately elliptical shaped; and
at least a part of the protrusion portions or the recess portions is arranged at a predetermined pitch in an arbitrary cross section of the multilayer tape taken in the longitudinal direction of the submarine cable.

11. The multilayer tape for an impermeable layer of a submarine cable according to claim 10, wherein
the metal layer includes approximately circular first protrusion portions or recess portions and approximately circular second protrusion portions or recess portions that are arranged respectively in a lattice shape of a pitch P1, which is the pitch in the width direction of the multilayer tape, and a pitch P2, which is the pitch in the longitudinal direction of the multilayer tape, zigzag to each other;
each of the protrusion portions or the recess portions of the first protrusion portions or recess portions and the second protrusion portions or recess portions are arranged in the longitudinal direction of the multilayer tape; and
if the diameter of the first protrusion portion or recess portion is D1 and the diameter of the second protrusion portion or recess portion is D2, the relations D1<P1 and D1<P2, D2<P1,D2<P2 and P1<D1+D2 and D1+D2< $(P1^2+P2^2)^{1/2}$ are satisfied.

12. The multilayer tape for an impermeable layer of a submarine cable according to claim 10, wherein
the metal layer includes first protrusion portions or recess portions and second protrusion portions or recess portions that are arranged respectively in a lattice shape of the same pitch P, zigzag to each other; and
if the diameter of the first protrusion portion or recess portion is D1 and the diameter of the second protrusion portion or recess portion is D2, the relation D1<P and D2<P and P<D1+D2<$2^{1/2}$×P is satisfied, and furthermore, the relation P<$2^{1/2}$×D1 or P<$2^{1/2}$×D2 is satisfied.

13. The multilayer tape for an impermeable layer of a submarine cable according to claim 10, wherein
the metal layer includes approximately circular first protrusion portions or recess portions and approximately circular second protrusion portions or recess portions that are arranged respectively in a rhombus-shaped form of the same pitch P, zigzag to each other; and
if the diameter of the first protrusion portion or recess portion is D1, the diameter of the second protrusion portion or recess portion is D2, the pitch of the first protrusion portion or recess portion in the diagonal direction of the rhombus, which is the pitch for the width direction of the multilayer tape, is P1, and the pitch of the first protrusion portion or recess portion in the diagonal direction of the rhombus, which is the pitch for the longitudinal direction of the multilayer tape, is P2, the relation D1<P and D2<P and (D1+D2)<P1 and (D1+D2)<P2 is satisfied, and, further more, the relation P1<2D1 or P1<2D2 is also satisfied.

14. The multilayer tape for an impermeable layer of a submarine cable according to claim 10, wherein
   the metal layer includes approximately elliptical first protrusion portions or recess portions and approximately elliptical second protrusion portions or recess portions that are arranged in a lattice shape of a pitch P1 in the width direction of the multilayer tape and a pitch P2 in the longitudinal direction of the multilayer tape respectively, zigzag to each other;
   the direction of the major axis or the minor axis of each of the protrusion portions or the recess portions of the first protrusion portions or recess portions and the second protrusion portions or recess portions are arranged in the longitudinal direction of the multilayer tape and each of the protrusion portions or the recess portions of the first protrusion portions or recess portions and the second protrusion portions or recess portions are arranged in the longitudinal direction of the multilayer tape; and
   if the diameter of the first protrusion portion or recess portion in the width direction of the multilayer tape is D1W, the diameter of the first protrusion portion or recess portion in the longitudinal direction of the multilayer tape is D1L, the diameter of the second protrusion portion or recess portion in the width direction of the multilayer tape is D2W, the diameter of the second protrusion portion or recess portion in the longitudinal direction of the multilayer tape is D2L, the pitch of the first protrusion portion or recess portion in the oblique direction calculated by $(P1^2+P2^2)^{1/2}$ is P3, the length of the second protrusion portion or recess portion on a line segment which connects the first protrusion portions or recess portions in the oblique direction is D2S, and the length of the first protrusion portion or recess portion on a line segment which connects the second protrusion portions or recess portions in the oblique direction is D1S, then the relation D1W<P1 and D1L<P2 and D2W<P1 and D2L<P2 and P1<D1W +D2W and D1S+D2S<P3 is satisfied.

15. The multilayer tape for an impermeable layer of a submarine cable according to claim 10, wherein
   the metal layer includes approximately elliptical first protrusion portions or recess portions and approximately elliptical second protrusion portions or recess portions that are arranged in a lattice shape of the same pitch P, zigzag to each other;
   the direction of the major axis or the minor axis of each of the protrusion portions or the recess portions of the first protrusion portions or recess portions and the second protrusion portions or recess portions are arranged in the longitudinal direction of the multilayer tape and the diagonal lines of the lattice form are arranged in the longitudinal direction of the multilayer tape; and
   if the diameter of the first protrusion portion or recess portion in the width direction of the multilayer tape is D1W, the diameter of the first protrusion portion or recess portion in the longitudinal direction of the multilayer tape is D1L, the diameter of the second protrusion portion or recess portion in the width direction of the multilayer tape is D2W, the diameter of the second protrusion portion or recess portion in the longitudinal direction of the multilayer tape is D2L, the pitch of the first protrusion portion or recess portion in the oblique direction calculated by $2^{1/2}P$ is P3, the length of the second protrusion portion or recess portion on a line segment which connects the first protrusion portions or recess portions in the oblique direction is D2S, and the length of the first protrusion portion or recess portion on a line segment which connects the second protrusion portions or recess portions in the oblique direction is D1S, then the relation D1W<P and D1L<P and D2W<P and D2L<P and D1W+D2W<P3 and D1L+D2L<P3 is satisfied and, furthermore, $P<2^{1/2}D1W$ or $P<2^{1/2}\times D2W$ and $P<2^{1/2}\times D1L$ or $P<2^{1/2}\times D2L$ is also satisfied.

16. The multilayer tape for an impermeable layer of a submarine cable according to claim 10, wherein
   the metal layer includes approximately elliptical first protrusion portions or recess portions and approximately elliptical second protrusion portions or recess portions that are arranged in a rhombus-shaped form of the same pitch P, zigzag to each other;
   the direction of the major axis or the minor axis of each of the protrusion portions or the recess portions of the first protrusion portions or recess portions and the second protrusion portions or recess portions are arranged in the longitudinal direction of the multilayer tape and the diagonal lines of the rhombus are arranged in the longitudinal direction of the multilayer tape; and
   if the diameter of the first protrusion portion or recess portion in the width direction of the multilayer tape is D1W, the diameter of the first protrusion portion or recess portion in the longitudinal direction of the multilayer tape is D1L, the diameter of the second protrusion portion or recess portion in the width direction of the multilayer tape is D2W, the diameter of the second protrusion portion or recess portion in the longitudinal direction of the multilayer tape is D2L, the pitch of the first protrusion portion or recess portion in the oblique direction, which is the pitch for the width direction of the multilayer tape, is P1, the pitch of the first protrusion portion or recess portion in the oblique direction, which is the pitch for the longitudinal direction of the multilayer tape, is P2, the length of the second protrusion portion or recess portion on a line segment which connects the first protrusion portions or recess portions in the forming direction thereof is D2S, and the length of the first protrusion portion or recess portion on a line segment which connects the second protrusion portions or recess portions in the forming direction thereof is D1S, then the relation D1S<P and D2S<P and (D1W+D2W)<P1 and (D1L+D2L)<P2 is satisfied and, furthermore, the relation P1<2D1W or P1<2D2W is also satisfied.

17. The multilayer tape for an impermeable layer of a submarine cable according to claim 10, wherein the cross sections of the protrusion portions or the recess portions are arc-shaped.

* * * * *